United States Patent
Asakawa et al.

(10) Patent No.: US 9,696,711 B2
(45) Date of Patent: Jul. 4, 2017

(54) PROCESSING INSTRUCTING DEVICE, PROCESSING INSTRUCTING METHOD, COMPUTER PROGRAM AND PROCESSING DEVICE

(75) Inventors: Teruo Asakawa, Tokyo (JP); Hirofumi Yamaguchi, Nirasaki (JP); Supika Mashiro, Tokyo (JP); Toshihiko Iijima, Fuchu (JP); Hirokazu Narisawa, Fuchu (JP); Kou Fujimura, Fuchu (JP)

(73) Assignee: TOKYO ELECTRON LIMITED, Tokyo (JP)

(*) Notice: Subject to any disclaimer, the term of this patent is extended or adjusted under 35 U.S.C. 154(b) by 789 days.

(21) Appl. No.: 14/232,980

(22) PCT Filed: Jul. 12, 2012

(86) PCT No.: PCT/JP2012/067831
§ 371 (c)(1),
(2), (4) Date: May 22, 2014

(87) PCT Pub. No.: WO2013/011920
PCT Pub. Date: Jan. 24, 2013

(65) Prior Publication Data
US 2014/0358271 A1 Dec. 4, 2014

(30) Foreign Application Priority Data

Jul. 15, 2011 (JP) ................................ 2011-157113
Jul. 15, 2011 (JP) ................................ 2011-157114

(51) Int. Cl.
*G06F 19/00* (2011.01)
*G04F 1/00* (2006.01)
(Continued)

(52) U.S. Cl.
CPC ..... *G05B 19/402* (2013.01); *G05B 19/41865* (2013.01); *G05B 2219/2609* (2013.01);
(Continued)

(58) Field of Classification Search
CPC ............ G05B 19/402; G05B 19/41865; G05B 2219/32078; G05B 2219/49202;
(Continued)

(56) References Cited

U.S. PATENT DOCUMENTS 4,338,672 A * 7/1982 Perzley .................... B25J 9/161
                                                    318/568.13
7,085,614 B1    8/2006 Gartland et al.
(Continued)

FOREIGN PATENT DOCUMENTS

JP     7-307301 A      11/1995
JP     2001-283137 A   10/2001
(Continued)

OTHER PUBLICATIONS

International Search Report mailed Oct. 2, 2012 in PCT/JP2012/067831, 7 pages.
(Continued)

Primary Examiner — Robert Fennema
Assistant Examiner — Thomas Stevens
(74) Attorney, Agent, or Firm — Rothwell, Figg, Ernst & Manbeck, P.C.

(57) ABSTRACT

A processing indicating device to improve the efficiency of processing on an object. The device includes a first communication unit which communicates information with a plurality of processing devices for processing the object and a second communication unit which communicates information with a conveyance controlling device controlling conveying of the object to the plurality of processing devices. An arrival time predicting unit predicts on the basis of information received by the second communication unit, the time when the conveying device arrives at one of the processing devices. In addition, a finish time predicting unit receives information and predicts the time when the pro-
(Continued)

cessing on the object in the one processing device finishes. A processing indicating unit causes processing control information that orders the execution of device state improvement treatment to be transmitted to the one processing device on the basis of the predicted respective times.

20 Claims, 13 Drawing Sheets

(51) Int. Cl.
*H01L 21/00* (2006.01)
*G05B 19/402* (2006.01)
*G05B 19/418* (2006.01)

(52) U.S. Cl.
CPC .............. *G05B 2219/32078* (2013.01); *G05B 2219/32272* (2013.01); *G05B 2219/32277* (2013.01); *G05B 2219/32311* (2013.01); *G05B 2219/49202* (2013.01); *Y02P 90/14* (2015.11); *Y02P 90/20* (2015.11); *Y02P 90/28* (2015.11); *Y02P 90/285* (2015.11)

(58) Field of Classification Search
CPC .. G05B 2219/2609; G05B 2219/32277; G05B 2219/32311; G05B 2219/32272; Y02P 90/14; Y02P 90/285; Y02P 90/28; Y02P 90/20

USPC ........ 438/16, 618, 8; 700/110, 100; 702/176
See application file for complete search history.

(56) References Cited

U.S. PATENT DOCUMENTS 8,862,441 B2 * 10/2014 Mitsunari ............... B24B 51/00
703/2
9,268,328 B2 * 2/2016 Asakawa ......... G05B 19/41865

FOREIGN PATENT DOCUMENTS

| JP | 2004-134778 A | 4/2004 |
| JP | 2005-208891 A | 8/2005 |
| JP | 2007-88429 A | 4/2007 |
| JP | 2007-266263 A | 10/2007 |
| JP | 2007-324454 A | 12/2007 |
| JP | 2008-121054 A | 5/2008 |
| JP | 2008-250826 A | 10/2008 |
| JP | 2008-310467 A | 12/2008 |
| JP | 2009-135275 A | 6/2009 |

OTHER PUBLICATIONS

Yamamoto Makoto, "Next Generation Conveyance System" (SEMI News, vol. 22, No. 6 Nov.-Dec. 2006) with its English translation, 8 pgs.

* cited by examiner

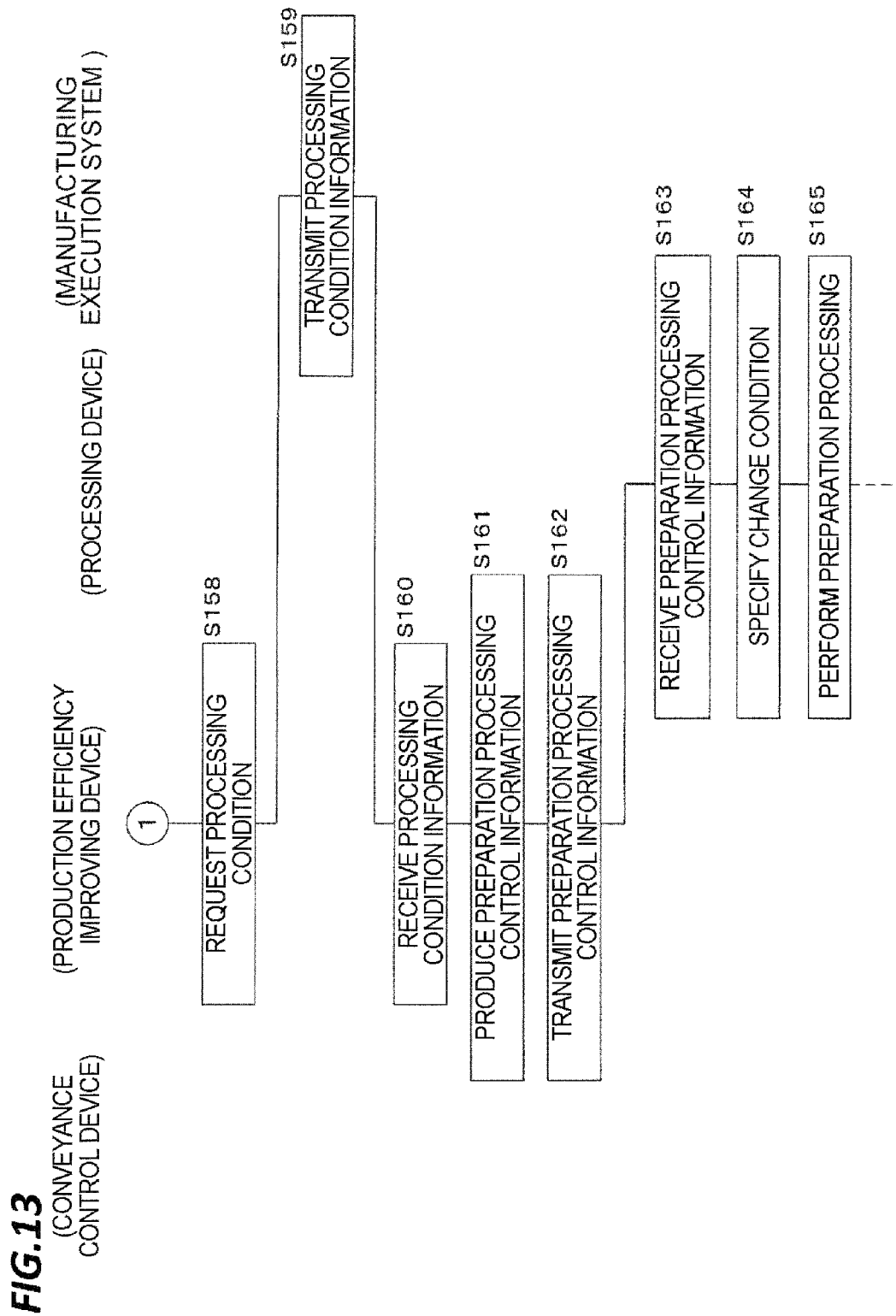

PROCESSING INSTRUCTING DEVICE, PROCESSING INSTRUCTING METHOD, COMPUTER PROGRAM AND PROCESSING DEVICE

CROSS REFERENCE TO RELATED APPLICATION

This application is a 35 U.S.C. 371 National Phase Entry Application from PCT/JP2012/067831, filed Jul. 12, 2012, which claims the benefit of Japanese Patent Application Nos. 2011-157113 and 2011-157114, both filed Jul. 15, 2011, the disclosures of which are incorporated herein in their entirety by reference.

TECHNICAL FIELD

The present disclosure relates to a processing instructing device, a processing instructing method, a computer program configured to operate a computer as the processing instructing device, and a processing device that improve processing efficiency of workpieces to be processed in a production processing system in which the workpieces are conveyed and processed among a plurality of processing device.

BACKGROUND ART

Production in a manufacturing factory having a job-shop type production system (for example, a semiconductor device manufacturing factory or a manufacturing factory for organic EL devices or the like) is executed by the manufacturing execution system (MES). In such manufacturing factories, a production processing system has been put to a practical use. The production processing system includes a plurality of processing devices that process workpieces, a plurality of conveyance devices that convey the workpieces among the plurality of processing devices, a conveyance control device that controls the operations of the plurality of conveyance devices, and the manufacturing execution system that determines the processing devices in which workpieces should be processed, to instruct a recovery destination and a conveyance destination of the workpieces to the conveyance control device as well as to instruct processing contents for the workpieces to the processing devices.

Patent Document 1 discloses a processor management system that, when a time until a workpiece to be preferentially processed arrives at a processing device is sufficiently long, permits the processing device to process a workpiece other than the workpiece to be preferentially processed and, when a time until the workpiece to be preferentially processed arrives at the processing device is short, instructs the processing device to wait for the arrival of the workpiece to be preferentially processed.

Patent Document 2 discloses a power supplying system that compares an arrival time taken for arrival of a workpiece and an activation time of a processing device which is in a power saving state and, when the arrival time is longer than the activation time, causes the processing device to be in the power saving state.

Meanwhile, Patent Document 3 discloses software that includes a sequence of communicating with a plurality of processing devices that process workpieces, a sequence of communicating with a plurality of conveyance devices that convey the workpieces from an arbitrary processing device to another arbitrary processing device, and a sequence of communicating with the manufacturing execution system (MES) that instructs a processing on the workpieces to the processing devices. The software includes at least one of a conveyance instructing sequence of instructing movement of the conveyance devices to the conveyance devices by using the information and a processing instructing sequence of instructing a processing to be executed to the processing devices by using the information.

In Non-Patent Document 1, it is disclosed that conveyance efficiency may be improved when the factory production management system (manufacturing execution system ("MES") and a conveyance control system (material control system ("MCS")) configured to control a conveyance system (overhead hoist transport ("OHT")) by receiving various instructions from the MES, share information such as, for example, a factory layout. It is also disclosed that, when buffers capable of directly moving and loading from a carriage of the OHT, for example, over head buffers ("OHBs") (racks below an OHT rail), are provided and a device group of the next process are known in advance, the workpieces to be conveyed to a designated device within a short time by carrying the workpieces to the buffers of the corresponding bay without using a stocker.

PRIOR ART DOCUMENT

Patent Document

Patent Document 1: Japanese Patent Laid-Open Publication No. 2008-250826
Patent Document 2: Japanese Patent Laid-Open Publication No. 2007-88429
Patent Document 3: Japanese Patent Laid-Open Publication No. 2009-135275
Patent Document 4: Japanese Patent Laid-Open Publication No. 2008-310467
Patent Document 5: Japanese Patent Laid-Open Publication No. 2004-134778

Non-Patent Document

Non-Patent Document 1: Yamamoto Makoto, "Next Generation Conveyance System," SEMI News, Vol. 22, No. 6 November-December 2006.

SUMMARY OF INVENTION

Technical Problem

In the conventional system, however, the control by the manufacturing execution system is performed according to a flow in which, when a processing device finishes a one unit processing of a workpiece, the finish of the processing is reported from the processing device, the manufacturing execution system instructs recovery of the processed workpiece and conveyance of a workpiece to be processed subsequently to a conveyance system. Until the workpiece arrives at the processing device, information such as a time when the workpiece arrives at the processing device and an item and a processing condition of the workpiece is not given to the processing device.

Accordingly, there is a problem in that, since the processing device cannot perform a preparation processing required for processing the workpieces in advance, a time until the processing on the workpiece starts after the workpiece reaches the processing device is required, and as a result, a lead time until a product is manufactured is lengthened.

Further, there is a problem in that, since the processing device is in a device state improving treatment (a treatment for maintaining a function of the device which may be executed by the control system of the processing device during a non-production processing) such as plasma cleaning even though the workpiece arrives at the processing device, the processing on the workpiece cannot be started, and as a result, use efficiency of the processing device deteriorates and a lead time until a product is manufactured may be lengthened.

This problem occurs because the MES gives a logical instruction associated with a production plan and present state information of the processing device without considering a physicochemical reaction time of the processing device, and does not give even the information to the processing device until the conveyance of the workpieces were practically finished and the processing device reports that it has received a workpiece.

Meanwhile, since the MES does not have information regarding a detailed timing of a conveyance device, the MES may not directly control timings for processings such as a preparation processing and a device state improving treatment of a processing device in the MES layer. Further, when precise optimization is performed by giving detailed information on the conveyance devices to the MES and the optimized control information is dropped to a processing device at a terminal end of the layer again, localization of the system is hindered, thereby degrading efficiency and delaying the reaction speed of the MES.

An object of the present disclosure is to shorten a waiting time until a processing on a workpiece begins after the workpiece reaches the processing device, and to improve processing performance of all of a plurality of processing devices, by avoiding a situation in which a processing device cannot processes a workpiece because the processing device is in a device state improving treatment, even though the workpiece has arrived at the processing device.

In a conventional system, a processing device reports to the manufacturing execution system MES on a situation where a processing on a workpiece has been completed when the processing on the workpiece has been completed, and then, the manufacturing management system, after receiving the report, instructs recovery and delivery of the workpiece to a conveyance control device. Subsequently, when the processed workpiece is subjected to the recovery, the processing device reports to the production management system MES that the processing device is in a state in which a load port is empty to be capable of receiving a workpiece to be subsequently processed. Then, after receiving the report, the production management system selects a workpiece to be subsequently processed in the processing device and instruct the conveyance control device to deliver the designated workpiece to the processing device. In the system configured as described above, it takes a long time until the workpiece is recovered by a conveyance device after the processing on the workpiece in the processing device has been finished. In addition, it also takes a long time until a workpiece to be subsequently processed arrives at the processing device. For this reason, a situation in which no workpiece to be subsequently processed exists in the processing device may occur, thereby degrading production efficiency in the factory. When a plurality of processing devices in which a processing on a workpiece has been finished are present in some regions in the factory, there is a concern in that a situation may occur in which conveyance devices are congested on a conveyance path around a processing device and it may take a long time for conveyance, thereby degrading production efficiency in the factory.

The present disclosure has been made in consideration of such situations, and another object of the present disclosure is to improve production efficiency by speculatively moving a conveyance device by predicting a processing finish time of workpieces in a processing device.

Yet another object of the present disclosure is to shorten a waiting time until a processing on a workpiece begins after the workpiece arrives at the processing device, and to improve the overall processing efficiency of a plurality of processing devices by avoiding a situation in which a processing device cannot process a workpiece to be processed because the processing device is in a device state improving treatment even though the workpiece has arrived at the processing device.

Solution to Problem

A processing instructing device according to the present disclosure includes: a first communication unit that communicates information for controlling operation of a plurality of processing devices with the plurality of processing devices that process a workpiece; a second communication unit that communicates information with a conveyance control device configured to control operation of a conveyance device that conveys the workpiece to the plurality of processing devices; an arrival time predicting unit that, based on the information received by the second communication unit, predicts a time when the conveyance device arrives at one of the plurality of processing device; a finish time predicting unit that receives information indicating that a processing on the workpiece in the one processing device has been finished by the first communication unit or, based on the information received by the first communication unit, predicts a time when the processing on the workpiece in the one processing device is finished; and a processing instructing unit that, based on the time predicted by the arrival time predicting unit and the time predicted by the finish time predicting unit, causes processing control information which instructs execution of a device state improving treatment to be transmitted to the one processing device by the first communication unit.

In the processing instructing device according to the present disclosure, when a cumulative value of processings on workpieces according to production in the one processing device is equal to or larger than a first set cumulative-value or a length of time between the time predicted by the finish time predicting unit and the time predicted by the arrival time predicting unit is equal to or longer than a predetermined length of time, the processing instructing unit causes processing control information, which instructs the execution of the device state improving treatment, to be transmitted to the one processing device.

In the processing instructing device according to the present disclosure, when the cumulative value of processings on workpieces according to production in the one processing device is equal to or larger than a second set cumulative-value which is larger than the first set cumulative-value, the processing instructing unit causes the processing control information, which instructs the execution of the device state improving treatment, to be transmitted to the one processing device regardless of an arrival schedule time.

In the processing instructing device according to the present disclosure, the cumulative value of processings on workpieces according to production is the number of cumulative times of processings performed on workpieces or a cumulative thickness of films formed on the workpieces by the processings on the workpieces in the one processing device since the last time when the device state improving treatment was executed in the one processing device.

The processing instructing device according to the present disclosure further includes a third communication unit that communicates information which indicates a processing content for the workpiece in the processing device with a processing execution control device that controlling the operations of the processing device and the conveyance device. The information received by the second communication unit or the third communication unit includes identification information for identifying the workpiece transported to the one processing device. In addition, the processing instructing device further includes a unit that requests information on the processing content for the workpiece corresponding to the identification information from the processing execution control device, before the workpiece reaches the one processing device. The processing instructing unit causes the processing control information, which instructs execution of a preparation processing corresponding to the processing content for the workpiece, to be transmitted to the one processing device by the first communication unit before the time predicted by the arrival time predicting unit.

In the processing instructing device according to the present disclosure, the third communication unit or the first communication unit is configured to receive information that indicates a time required for the preparation processing, an energy consumption amount per unit time when a processing finish state in the one processing device is continued, an energy consumption amount per unit time when a preparation processing finish state in the one processing device is continued, and the information which indicates that the processing on the workpiece in the one processing device has been finished. The processing instructing device further includes a unit that, when information which indicates that the processing on the workpiece in the one processing device has been finished is received by the third communication unit or the first communication unit, compares the energy consumption amount per unit time when the preparation processing finish state is continued and the energy consumption amount per unit time when the processing finish state in the one processing device is continued. When the energy consumption amount per unit time when the preparation processing finish state is continued is larger than the energy consumption amount per unit time when the processing finish state in the one processing device ends is continued, the processing instructing unit causes the processing control information, which instructs the execution of the preparation processing at a point of time before or after a predetermined length of time from a time which is earlier than the arrival time predicted by the arrival time predicting unit by a length of time required for the preparation processing, to be transmitted to the one processing device by the first communication unit.

In the processing instructing device according to the present disclosure, the energy consumption amount per unit time is a consumption amount of power or gas.

In the processing instructing device according to the present disclosure, the information received by the second communication unit or the third communication unit includes a plurality of pieces of identification information for identifying each of workpieces sequentially processed in the processing device, and the arrival time predicting unit is configured to predict the time when the conveyance device arrives at the processing device, based on the information received by the second communication unit or the third communication unit and the processing content for the workpiece.

In the processing instructing device according to the present disclosure, the information received by the third communication unit includes information which indicates a time when the processing content is switched in the processing device, and the arrival time predicting unit predicts the time when the conveyance device arrives at the one processing device, based on the information received by the second communication unit and the third communication unit.

The processing instructing device according to the present disclosure further includes: a memory device that stores a control content for the processing device; and a unit that, based on the control content, calculates a processing performance of the plurality of processing devices that have been operated. The processing instructing unit is configured to cause the processing control information to be transmitted, based on the control content stored in the memory device and the calculated processing performance.

In the processing instructing device according to the present disclosure, the information received by the second communication unit includes information for controlling the operation of the conveyance device.

In the processing instructing device according to the present disclosure, the information received by the second communication unit includes information which indicates a predicted time when the conveyance device arrives at the processing device.

In the processing instructing device according to the present disclosure, the device state improving treatment is a cleaning processing performed by placing a dummy workpiece, which is not associated with production, in a processing chamber.

The processing instructing device according to the present disclosure further includes a unit that is stored with information which specifies processing chambers capable of performing the same processing and a set value of the number of producible processing chambers which indicates the number of processing chambers to be secured as processing chambers capable of performing the same processing on workpieces. The processing instructing unit suppresses the instruction of the device state improving treatment so that, among the processing chambers capable of performing the same processing, the processing chambers of the number indicated by the set value of the number of producible processing chambers are in a producible processing state.

A processing instructing device the present disclosure includes: a first communication unit that communicates information with a plurality of processing devices that process a workpiece; a second communication unit that communicates information with a conveyance control device configured to control an operation of a conveyance device that conveys the workpiece to the plurality of processing devices; a conveyance time predicting unit that, based on the information communicated by the first communication unit, predicts a conveyance time when one processing device at a communication destination of the information requires conveyance of a workpiece; a first processing instructing unit that causes processing control information to be transmitted to the conveyance by the second communication unit so that the conveyance device arrives at the processing device at the communication destination of the information at the conveyance time predicted by the conveyance time predicting unit; an arrival time predicting unit that, based on the information received by the second communication unit, predicts a time when the conveyance device arrives at the one processing device; a finish time predicting unit that receives information which indicates that the processing on the workpiece in the one processing device has been finished by the first communication unit, or, based on received information received by the first communication unit, predicts a time when the processing on the workpiece in the one processing device is finished; and a second processing instructing unit that, based on the time predicted by the arrival time predicting unit and the time predicted by the finish time predicting unit, causes the first communication unit processing control information, which instructs execution of a device state improving treatment, to be transmitted to the one processing device.

A processing instructing method according to the present disclosure includes: a first communication step of communicating information for controlling an operation of a plurality of processing devices with the plurality of processing devices that process a workpiece; a second communication step of communicating information with a conveyance control device configured to control an operation of a conveyance device that conveys the workpiece to the plurality of processing devices; an arrival time predicting step of, based on the information received in the second communication step, predicting a time when the conveyance device arrives at one of the plurality of processing device; a finish time predicting step of receiving information indicating that a processing on the workpiece in the one processing device has been finished in the first communication step or, based on the information received in the first communication step, predicting a time when the processing on the workpiece in the one processing device is finished; and a processing instructing step of based on the time predicted by the arrival time predicting step and the time predicted in the finish time predicting step, causing processing control information, which instructs execution of a device state improving treatment, to be transmitted to the one processing device in the first communication step.

A processing instructing method according to the present disclosure includes: a first communication step of communicating information with a plurality of processing devices that processes a workpiece; a second communication step of communicating information with a conveyance control device configured to control an operation of a conveyance device that conveys the workpiece to the plurality of processing devices; a conveyance time predicting step of, based on the information communicated in the first communication step, predicting a conveyance time when one processing device at a communication destination of the information requires conveyance of a workpiece; a first processing instructing step of causing processing control information to be transmitted to the conveyance control device so that the conveyance device arrives at the processing device at the communication destination of the information at the conveyance time predicted in the conveyance time predicting step; an arrival time predicting step of, based on the information received in the second communication step, predicting a time when the conveyance device arrives at the one processing device; a finish time predicting step of receiving information, which indicates that the processing on the workpiece in the one processing device has been finished by the first communication step, or, based on received information received by the first communication step, predicting a time when the processing on the workpiece in the one processing device is finished; and a second processing instructing step of, based on the time predicted by the arrival time predicting unit and the time predicted by the finish time predicting step, causing the first communication unit processing control information, which instructs execution of a device state improving treatment, to be transmitted to the one processing device.

A computer program according to the present disclosure is configured to make a computer function as: a first communication unit that communicates information for controlling an operation of a plurality of processing devices with the plurality of processing devices that process a workpiece; a second communication unit that communicates information with a conveyance control device configured to control an operation of a conveyance device that conveys the workpiece to the plurality of processing devices; an arrival time predicting unit that, based on the information received by the second communication unit, predicts a time when the conveyance device arrives at one of the plurality of processing device; a finish time predicting unit that receives information indicating that a processing on the workpiece in the one processing device has been finished by the first communication unit or, based on the information received by the first communication unit, predicts a time when the processing on the workpiece in the one processing device is finished; and a processing instructing unit that, based on the time predicted by the arrival time predicting unit and the time predicted by the finish time predicting unit, causes processing control information which instructs execution of a device state improving processing to be transmitted to the one processing device by the first communication unit.

A computer program according to the present disclosure is configured to make a computer function as: a first communication unit that communicates information with a plurality of processing devices that process a workpiece; a second communication unit that communicates information with a conveyance control device configured to control an operation of a conveyance device that conveys the workpiece to the plurality of processing devices; a conveyance time predicting unit that, based on the information communicated by the first communication unit, predicts a conveyance time when one processing device at a communication destination of the information requires conveyance of a workpiece; a first processing instructing unit that causes processing control information to be transmitted to the conveyance by the second communication unit so that the conveyance device arrives at the processing device at the communication destination of the information at the conveyance time predicted by the conveyance time predicting unit; an arrival time predicting unit that, based on the information received by the second communication unit, predicts a time when the conveyance device arrives at the one processing device; a finish time predicting unit that receives information which indicates that the processing on the workpiece in the one processing device has been finished by the first communication unit, or, based on received information received by the first communication unit, predicts a time when the processing on the workpiece in the one processing device is finished; and a second processing instructing unit that, based on the time predicted by the arrival time predicting unit and the time predicted by the finish time predicting unit, causes the first communication unit processing control information, which instructs execution of a device state improving treatment, to be transmitted to the one processing device.

A processing device according to the present disclosure is a workpiece processing device and includes: a maintenance unit that executes a device state improving processing of the processing device; a unit that is stored with a cumulative value of processings on workpieces according to production after the device state improving treatment; and an arrival schedule time acquiring unit that acquires information which indicates a time when an unprocessed workpiece arrives at the processing device. The maintenance unit executes the device state improving treatment when the cumulative value is equal to or larger than a first set cumulative-value and a length of time until the time acquired by the arrival schedule time acquiring unit is equal to or longer than a set length of time.

In the workpiece processing device according to the present disclosure, when the cumulative value is equal to or larger than a second set cumulative-value which is larger than the first set cumulative-value, the maintenance unit executes the device state improving treatment regardless of a length of time until a schedule time when the workpiece arrives.

In the present disclosure, a time when a workpiece arrives at one processing device and a time when a processing on the workpiece is finished are predicted and execution of a device state improving processing is instructed at a timing when the use efficiency of the processing device does not deteriorate.

Advantageous Effects of Invention

According to the present disclosure, a waiting time until a processing on a workpiece begins after the workpiece has actually arrived at the processing device may be shortened so that the overall processing efficiency of a plurality of processing devices may be improved.

According to the present disclosure, a situation in which a processing device cannot make a workpiece be processed because the processing device is in a device state improving treatment even though the workpiece to be processed has reached the processing device may be avoided so that processing efficiency of all of a plurality of processing devices may be improved.

According to the present disclosure, conveyance devices are speculatively moved by predicting a processing finish time of workpieces in processing devices. As a result, a processing instruction processing for improving production efficiency may be additionally executed without degrading the reliability of a production control execution system.

BRIEF DESCRIPTION OF DRAWINGS

FIG. 13 is a flowchart illustrating a processing sequence in the production efficiency improving device according to the device state improving treatment and the preparation processing.

DETAILED DESCRIPTION TO EXECUTE THE INVENTION

Hereinafter, the present disclosure will be described in detail with reference to the accompanying drawings which illustrate exemplary embodiments of the present disclosure.

Exemplary Embodiment 1

Figure 1:
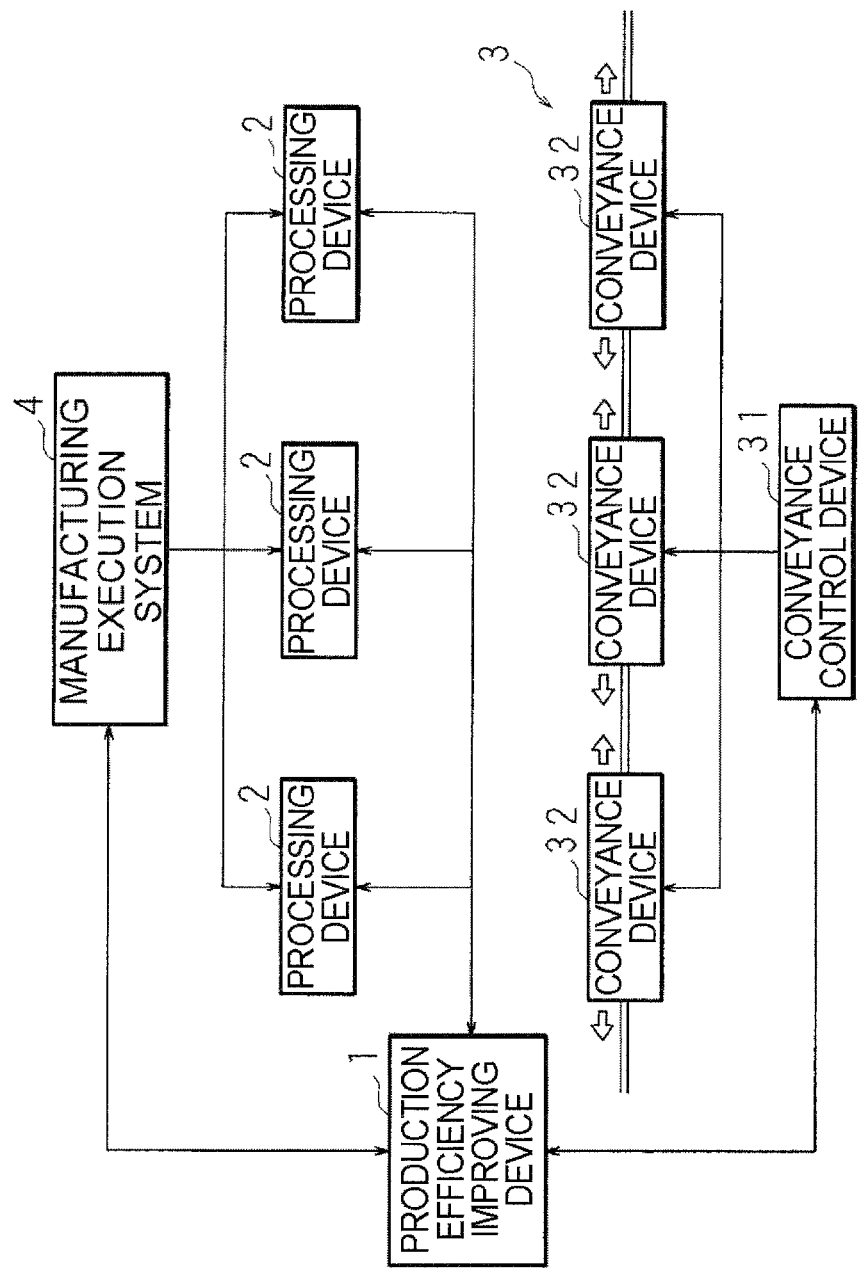
FIG. 1 is a block diagram illustrating a configuration example of a production processing system including a production efficiency improving device 1 according to Embodiment 1.

FIG. 1 is a block diagram illustrating a configuration example of a production processing system including a production efficiency improving device 1 (processing instructing device) according to Exemplary Embodiment 1. A production processing system according to Exemplary Embodiment 1 of the present disclosure includes a plurality of processing devices 2, a conveyance system 3 which includes a plurality of conveyance devices 32 and a conveyance control device 31 configured to control the operation of the conveyance devices 32, the manufacturing execution system (processing execution control device) 4 configured to control the operation of each device by giving control instructions to the processing device 2 and the conveyance system 3, and a production efficiency improving device 1 configured to communicate various pieces of information among the plurality of processing devices 2, the conveyance system 3, and the manufacturing execution system 4.

The manufacturing execution system 4 is a computer that configures a so-called MES, and includes a scheduler module that prepares a manufacturing plan according to, for example, a kind and a specification of products to be manufactured and a dispatcher module that specifies a processing device 2 in which a workpiece should be processed according to the prepared production plan and instructs processing contents and conveyance control contents for the workpieces to the processing device 2 and the conveyance system 3, respectively. Hereinafter, the information of controlling the operations of the processing devices 2 and the conveyance system 3, which is transmitted to each of the processing devices 2 and the conveyance system 3 from the manufacturing execution system 4, will be referred to as production execution control information.

A processing device 2 is a substrate processing device that processes a workpiece, for example, a glass substrate for manufacturing an organic EL device and a silicon wafer for manufacturing a semiconductor device, such as, for example, a plasma CVD device, a plasma etching device, a sputtering device, or a PVD device. Further, the processing device 2 has an adjustment processing function to change a processing condition parameter which may be changed in advance before a workpiece that requires a change in processing condition (recipe) arrives at the processing device. In addition, the processing device 2 has a function to arrange an environment for processing the workpiece by executing, for example, a cleaning process or an aging process when conditions before and after the processing condition are considerably different from each other. Moreover, the processing device 2 has a device state improving processing function of automatically executing a device state improving processing which includes a non-production processing sequence of automatically cleaning, aging or gas-purging of the inside of a processing chamber in order to appropriately maintain an processing performance and condition thereof. Further, the processing device 2 has a function of transmitting warning information when the sum of the processing number of workpieces or the processing time of the workpieces is more than a predetermined value so as to urge a worker to perform maintenance such as exchanging or cleaning of constituent elements. Further, the processing device 2 has a function of transmitting processing finish information, which shows that a processing of a workpiece has been finished, to the production efficiency improving device 1.

Figure 2:
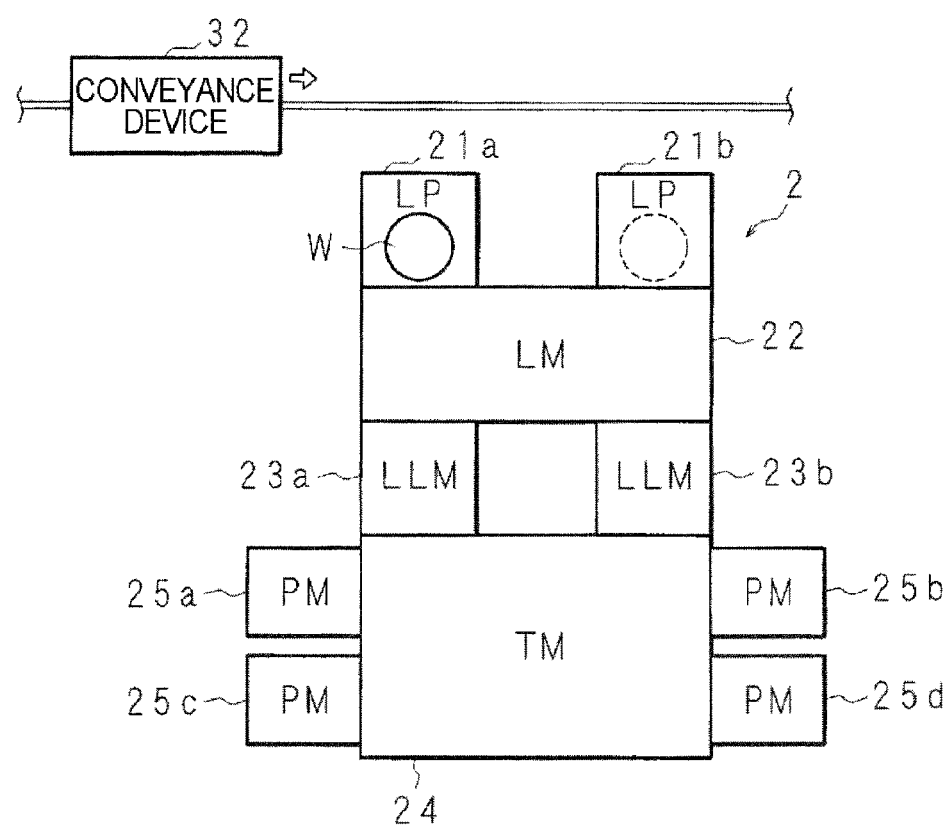
FIG. 2 is a block diagram illustrating a configuration example of a processing device.

FIG. 2 is a block diagram illustrating a configuration example of a processing device 2. The processing device 2 is, for example, a multi-chamber type substrate processing system. The processing device 2 includes a load module (LM) 22 which is provided with first and second load ports (LPs) 21a and 21b. A front open unified pod ("FOUP") configured to accommodate workpieces is disposed on each of the first and second LPs 21a and 21b so as to deliver or receive the FOUPs. The load module (LM) 22 is connected to a transfer module (TM) 24 via a load lock module (LLM) 23a or 23b. A vacuum robot provided in the transfer module 24 conveys workpieces carried into the transfer module 24 to process modules, 25a, 25b, 25c, and 25d through the load lock modules 23a, and 23b. The process modules 25a, 25b, 25c, and 25d perform a predetermined processing on the workpieces according to a recipe. The processed workpieces are moved in the reversed paths to be recovered to the FOUPs disposed on the first and the second load ports 21a and 21b and to be carried out from the load ports 21a and 21b by the FOUPs.

The conveyance system 3 includes a plurality of conveyance devices 32 and a conveyance control device 31.

A conveyance device 32 is, for example, a conveyance shuttle that travels on a track installed on a ceiling or a floor or an unmanned conveyance vehicle that travels on a predetermined route, and conveys an FOUP. The conveyance device 32 moves between the plurality of processing devices 2 and a stocker that stocks the FOUP according to the instruction given from the conveyance control device 31 so as to convey the workpieces accommodated in the FOUP.

The conveyance control device 31 is a computer that configures a so-called MCS, and controls an operation of each of the conveyance devices 32 according to one or both of the production execution control information given from the manufacturing execution system 4 or the production efficiency improving device 1, and control information given from the production efficiency improving device 1.

Figure 3:
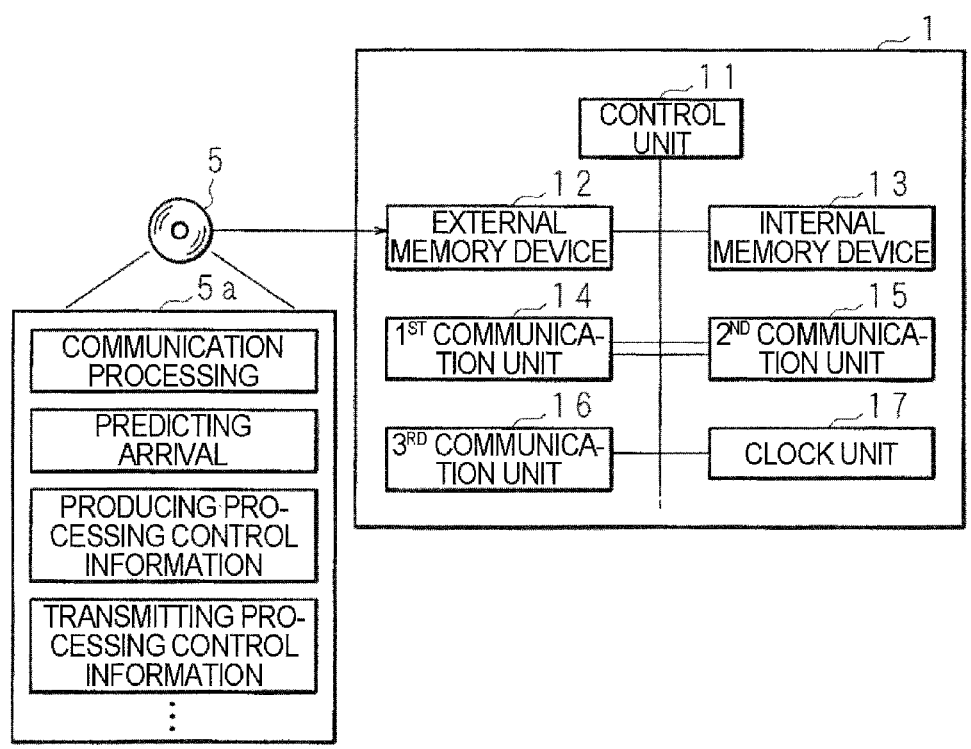
FIG. 3 is a block diagram illustrating a configuration example of a production efficiency improving device according to Exemplary Embodiment 1.

FIG. 3 is a block diagram illustrating a configuration example of the production efficiency improving device 1 according to Exemplary Embodiment 1. The production efficiency improving device 1 is a computer that has a function of receiving information transmitted from the conveyance system 3, for example, information for predicting the time when a workpiece arrives at a processing device 2, and instructing a processing device 2 to finish a currently executed device state improving processing as soon as possible and before the predicted arrival time of the workpiece by delaying the execution of the device state improving treatment, and a function of inquiring of the manufacturing execution system 4 about a processing condition for a workpiece and instructing the processing device 2 to execute a preparation processing of, for example, changing a processing condition which is required to be changed and is changeable in advance.

Further, the production efficiency improving device 1 is a computer that has a function of inquiring of the manufacturing execution system 4 about a workpiece processing schedule for a processing device group constituted by processing devices 2 that are in charge of a specific processing process or the same kind of processing devices 2, a function of inquiring of a processing device 2 about the number of workpieces to be capable of being processed or a length of time allowed to process the workpieces until the next periodic device state improving processing is executed, a function of optimizing an insertion timing of the device state improving treatment into the processing device 2 based on the received workpiece processing schedule and the periodic device state improving processing schedule, and a function of instructing the insertion of the device state improving treatment into the processing device 2. Specifically, the production efficiency improving device 1 instructs the early execution or delay of the insertion of the periodic device state improving processing of a processing device 2 according to an interval or a frequency until the next workpiece arrives at the processing device 2. Alternatively, when a plurality of processing devices 2 capable of executing the same processing are present in the processing device group, the production efficiency improving device 1 instructs the processing devices 2 to execute periodic maintenance works in such a manner that the periodic maintenance works shall not be concentrated in the same period.

As a hardware construction, the production efficiency improving device 1 is a computer that includes a control unit 11 configured to control an operation of each constituent element of the production efficiency improving device 1, for example, a central processing unit (CPU). The control unit 11 is connected with an internal memory device 13 that is connected through a bus, for example, a ROM or a RAM, an external memory device 12, for example, a hard disk drive, a solid state drive, or a CD-ROM drive that is capable of reading data from a portable recording medium, first to third communication units 14, 15 and 16, and a clock unit 17.

The ROM is a non-volatile memory that stores a control program required for operating the computer, for example, a mask ROM or an EEPROM.

The RAM is a volatile memory that temporarily stores various data generated when a calculation processing of the control unit 11 is executed or a control program required for operating the computer, for example, a DRAM or an SRAM.

The first to third communication units 14, 15 and 16 are interfaces that transmit/receive information to/from the processing devices 2, the conveyance control devices 31, and the manufacturing execution system 4, respectively. The transmission/reception of various pieces of information by the first to third communication units 14, 15, and 16 is controlled by the control unit 11.

A computer program 5a is stored in a computer-readable portable storage medium 5 such as a compact disc (CD)-ROM, a digital versatile disc (DVD)-ROM, or a blue-ray disc (BD), a hard disk drive, or a solid state drive. The control unit 11 reads the computer program 5a from the portable medium or the hard disk drive which is stored with the computer program 5a, and the control unit 11 stores the computer program 5a at the internal memory device 13. Needless to say, an optical disc and an optical disc drive are examples of the storage medium 5 and the external memory device 12, and the computer program 5a may be stored in a flexible disc, a magnet-optical disc, an external hard disc, a semiconductor memory, or the like to be computer-readable so that the computer program 5a may be read by the external memory device 12. Further, the computer program 5a according to the present disclosure may be configured to be downloaded from an external computer (not illustrated) connected to a communication network.

Figure 4:
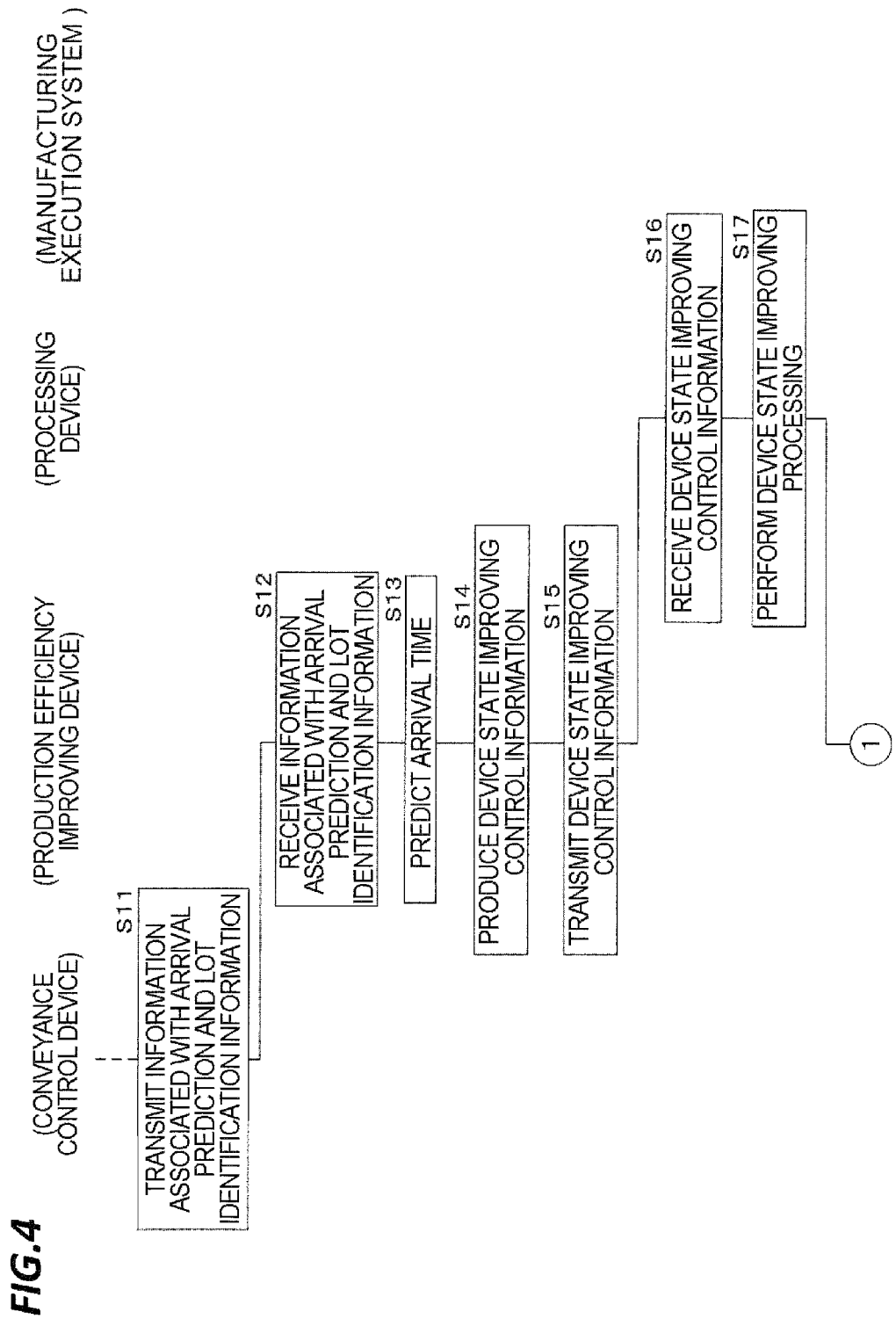
FIG. 4 is a flowchart illustrating a processing sequence in a production efficiency improving device according to a device state improving treatment and a preparation processing.
Figure 5:
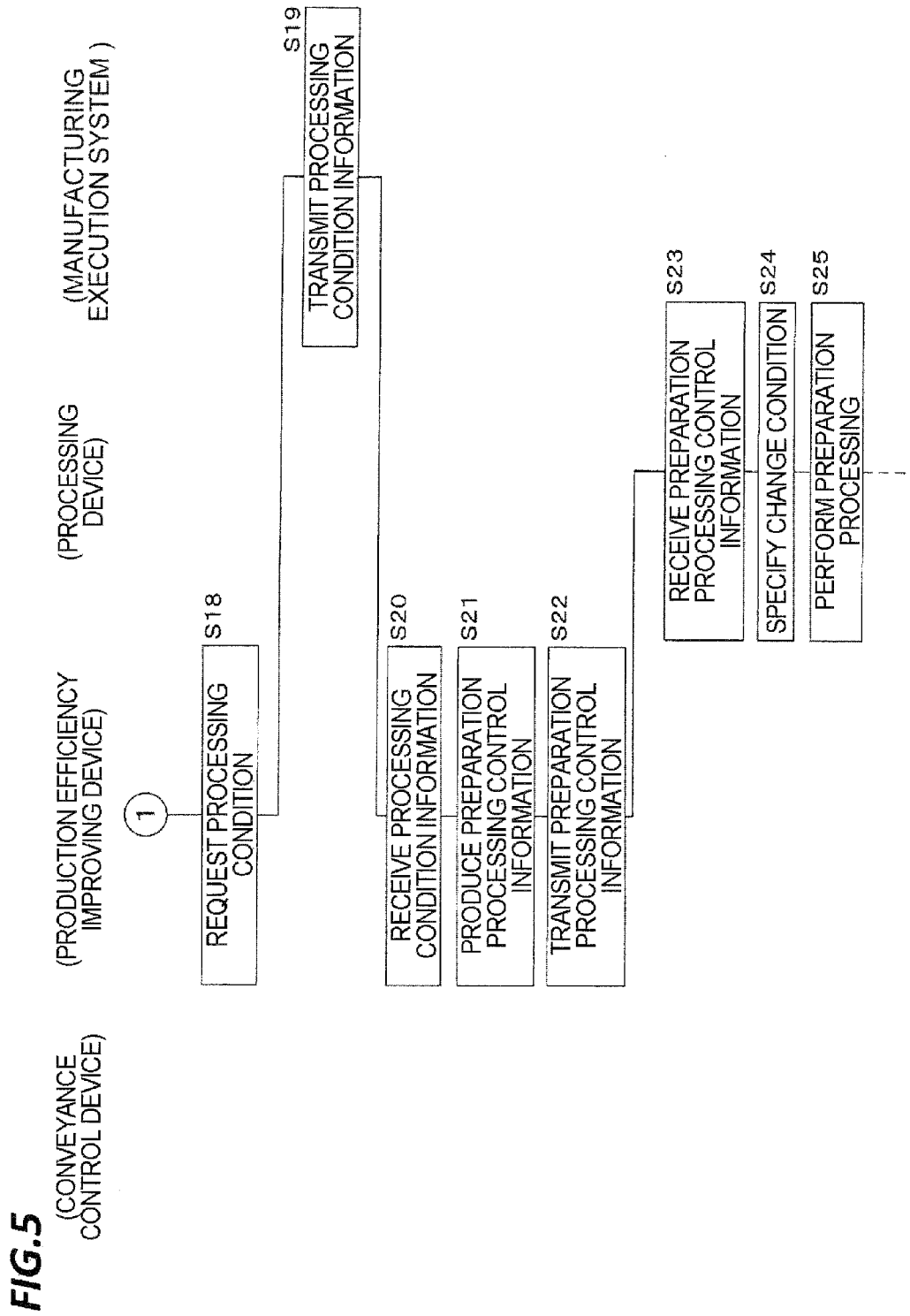
FIG. 5 is a flowchart illustrating the processing sequence in the production efficiency improving device according to the device state improving treatment and the preparation processing.

FIGS. 4 and 5 are flowcharts illustrating a processing sequence of the production efficiency improving device 1 according to a device state improving processing and a preparation processing. Hereinafter, descriptions will be made, in particular, on preceding processings related to preparation of arrival of a workpiece and change of a processing condition in a manufacturing sequence and a description on other processing sequences will be omitted.

Upon receiving a conveyance instruction, the conveyance control device 31, which controls the conveyance of a workpiece based on an instruction from the manufacturing execution system 4, transmits information for predicting the time when a conveyance device 32 arrives at a processing device 2 at a conveyance destination (hereinafter, referred to as "information associated with arrival prediction") and lot identification information for identifying a workpiece transported by the conveyance device 32, to the production efficiency improving device 1 (step S11). The information associated with arrival prediction is, for example, information that includes an instruction content of the manufacturing execution system 4, itself. For example, the information associated with arrival prediction includes a predicted arrival time calculated by the conveyance control device 31 based on the instruction content of the manufacturing execution system 4. Meanwhile, the information is one example and is not particularly limited as long as the information may be used to predict the time when the conveyance device 32 arrives at the processing device 2 and also includes auxiliary information for predicting the arrival time. The auxiliary information may include, for example, layout information of the processing devices 2 or information showing a past result required for conveyance.

The control unit 11 of the production efficiency improving device 1 receives the information associated with arrival prediction and the lot identification information which are transmitted from the conveyance control device 31 (step S12), and predicts the time when a predetermined conveyance device 32 arrives at the processing device 2 (step S13). Subsequently, the control unit 11 produces device state improving processing control information that controls the operation of the processing device 2 in such a manner that a device state improving processing is finished before the time when the conveyance device 32 arrives at the processing device 2 of the conveyance destination in which the device state improving treatment is configured by a non-production processing sequence for appropriately maintaining a processing performance or condition of the processing device 2 (step S14). In addition, the control unit 11 transmits the device state improving treatment control information produced in step S14 to the processing device 2 (step S15). For example, the device state improving treatment control information includes the predicted time when the workpiece arrives at the processing device 2 at the conveyance destination. The device state improving treatment information causes the processing device 2 to be controlled in the following manner: when the device state improving treatment in the processing device 2 may be finished before the predicted time, the device state improving treatment information causes the processing device 2 to start the device state improving treatment, when the device state improving treatment may not be finished before the predicted time, the device state improving treatment information causes the processing device 2 to delay the device state improving treatment, and while the device state improving treatment is being performed, the device state improving treatment information causes the processing device 2 to finish the device state improving treatment before the conveyance device 32 arrives.

The control unit 11 of the production efficiency improving device 1 may be configured to operate as follows. The control unit 11 receives information which indicates that a processing on a workpiece in one processing device 2 has been finished from the first communication unit 14 or predicts the time when the processing on the workpiece in the one processing device 2 is finished based on the information received from the first communication unit 14, produces processing control information which instructs the execution of the device state improving treatment, based on the predicted time when the conveyance device 32 arrives at the one processing device 2 and the predicted time when the processing on the workpiece is finished in the one processing device 2, and transmits the produced processing control information to the one processing device 2 by the first communication unit 14. The processing control information is transmitted to the processing device 2, for example, when it is estimated that the device state improving treatment in the processing device 2 is finished before and after the arrival of a conveyance device 32, that is, earlier or later than the predicted arrival time of the conveyance device 32 by a predetermined length of time. That is, the control unit 11 calculates a difference between the predicted time when the conveyance device 32 arrives at the one processing device 2 and the predicted time when the processing on the workpiece in the one processing device 2 is finished, that is, a time difference between the respective time points. When a difference between a length of time required for the device state improving treatment and the calculated time difference is less than a predetermined value, the control unit 11 transmits the processing control information which instructs the execution of the device state improving treatment to the one processing device 2. When receiving the processing control information, the one processing device 2 executes the device state improving treatment such as cleaning.

The processing device 2 receives the device state improving treatment control information transmitted from the production efficiency improving device 1 (step S16). In addition, the processing device 2 executes a processing such as starting or delaying of the device state improving treatment according to the received device state improving processing control information (step S17). Further, the processing device 2 executes a processing such as changing of an execution content of the device state improving treatment so as to finish the device state improving treatment as soon as possible and not later than the predicted arrival time of the workpiece.

The control unit 11 of the production efficiency improving device 1 transmits the lot identification information received in step S12 to the manufacturing execution system 4 so as to request a processing condition of the workpiece corresponding to the lot identification information, that is, a condition required by the processing device 2 to execute a specific processing for the workpiece (step S18).

The manufacturing execution system 4 specifies the processing condition of the workpiece corresponding to the lot identification information according to the request from the production efficiency improving device 1 and transmits processing condition information including the specified processing condition to the production efficiency improving device 1 (step S19).

The control unit 11 of the production efficiency improving device 1 receives the processing condition information transmitted from the manufacturing execution system 4 (step S20). Meanwhile, the control unit 11 directly receives the processing condition information from the manufacturing execution system 4, but may be configured to receive the processing condition information via another device, for example, the conveyance control device. In addition, the control unit 11 produces preparation processing control information for executing a preparation processing which is required for a processing to be performed by the processing device 2 on a workpiece which is scheduled to arrive at the processing device 2, including the processing condition information (step S21) and transmits the produced preparation processing control information to the processing device 2 at the conveyance destination of the workpiece (step S22).

The processing device 2 at the conveyance destination of the workpiece receives the preparation processing control information transmitted from the production efficiency improving device 1 (step S23). In addition, the processing device 2 specifies a condition to be changed by comparing a processing condition of the currently processed workpiece or a processing condition for a previously processed workpiece when the currently processed workpiece does not exist, and a processing condition for the workpiece which is scheduled to arrive at the processing device 2 (step S24). Meanwhile, the processing condition for the workpiece which is scheduled to arrive at the processing device 2 is included in the preparation processing control information.

Subsequently, the processing device 2 executes a preparation processing of changing a processing condition which may be changed in advance, among the processing conditions to be changed (step S25). For example, a temperature condition or the like is changed.

Thereafter, the conveyance control device 31 conveys the workpiece to a designated processing device 2 according to a workpiece delivery instruction from the manufacturing execution system 4 and places the workpiece in a load port of the processing device 2. At this time, since the processing device 2 is finishing the preparation processing required for processing the workpiece which has arrived at the processing device 2, the processing device 2 executes a specific processing on the workpiece which has arrived at the processing device 2 according to an instruction from the manufacturing execution system 4.

As described above, since, at the time point when the workpiece arrives at the processing device 2, the device state improving treatment which competes with a processing on the workpiece is finished or delayed and the preparation processing of changing the processing condition is also performed by the production efficiency improving device 1, the processing on the workpiece may be rapidly started.

As compared to the conventional system, that is, a system in which, when a workpiece arrives at a processing device 2, identification information of the workpiece is read and then, the arrival of the workpiece is reported to the manufacturing execution system 4, and the manufacturing execution system 4 instructs the processing condition of the workpiece which has arrived at the processing device 2 after receiving the reporting, a length of time from the arrival of the workpiece to the start of the processing on the workpiece may be shortened.

Figure 6:
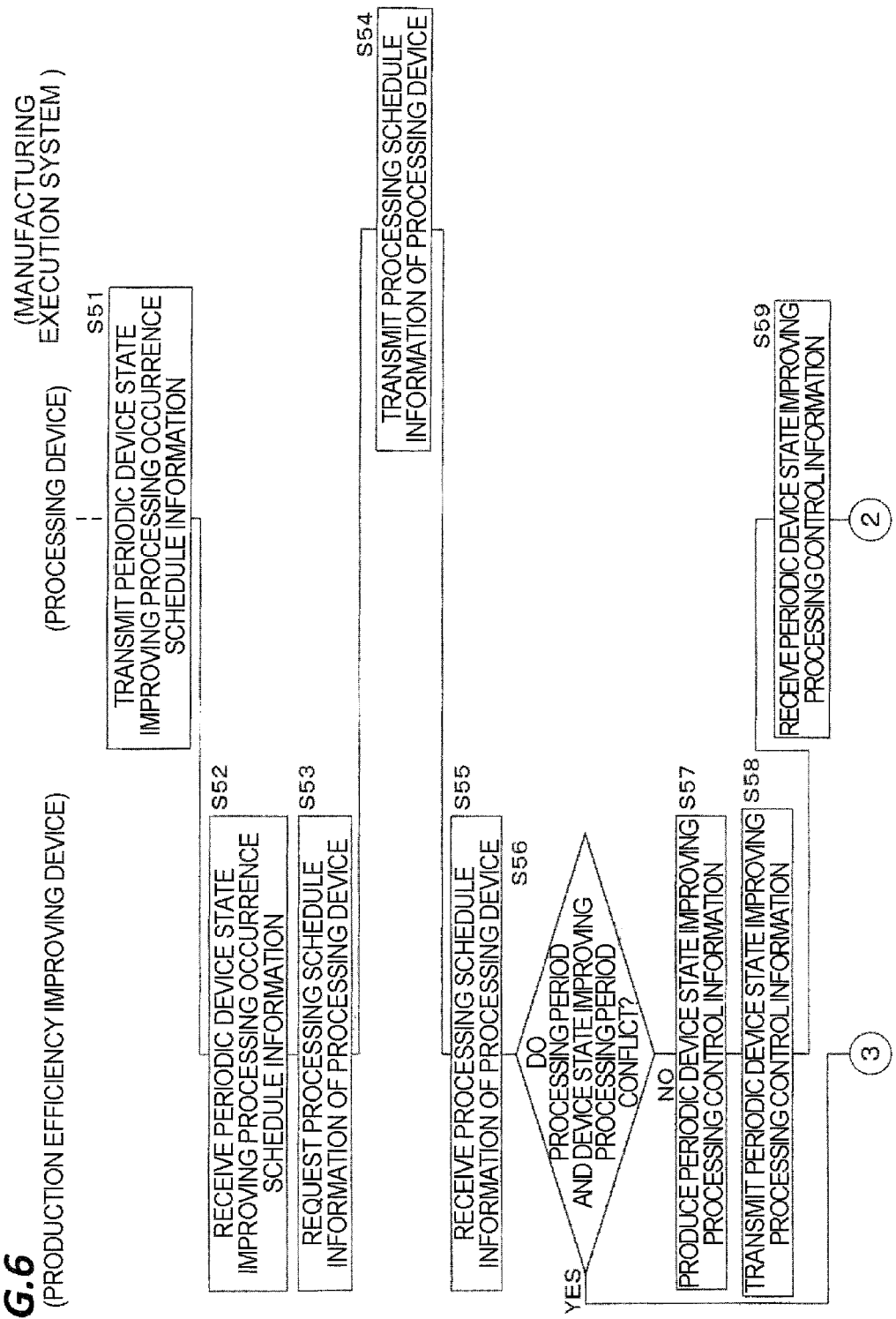
FIG. 6 is a flowchart illustrating the processing sequence in the production efficiency improving device according to a periodic device state improving treatment.
Figure 7:
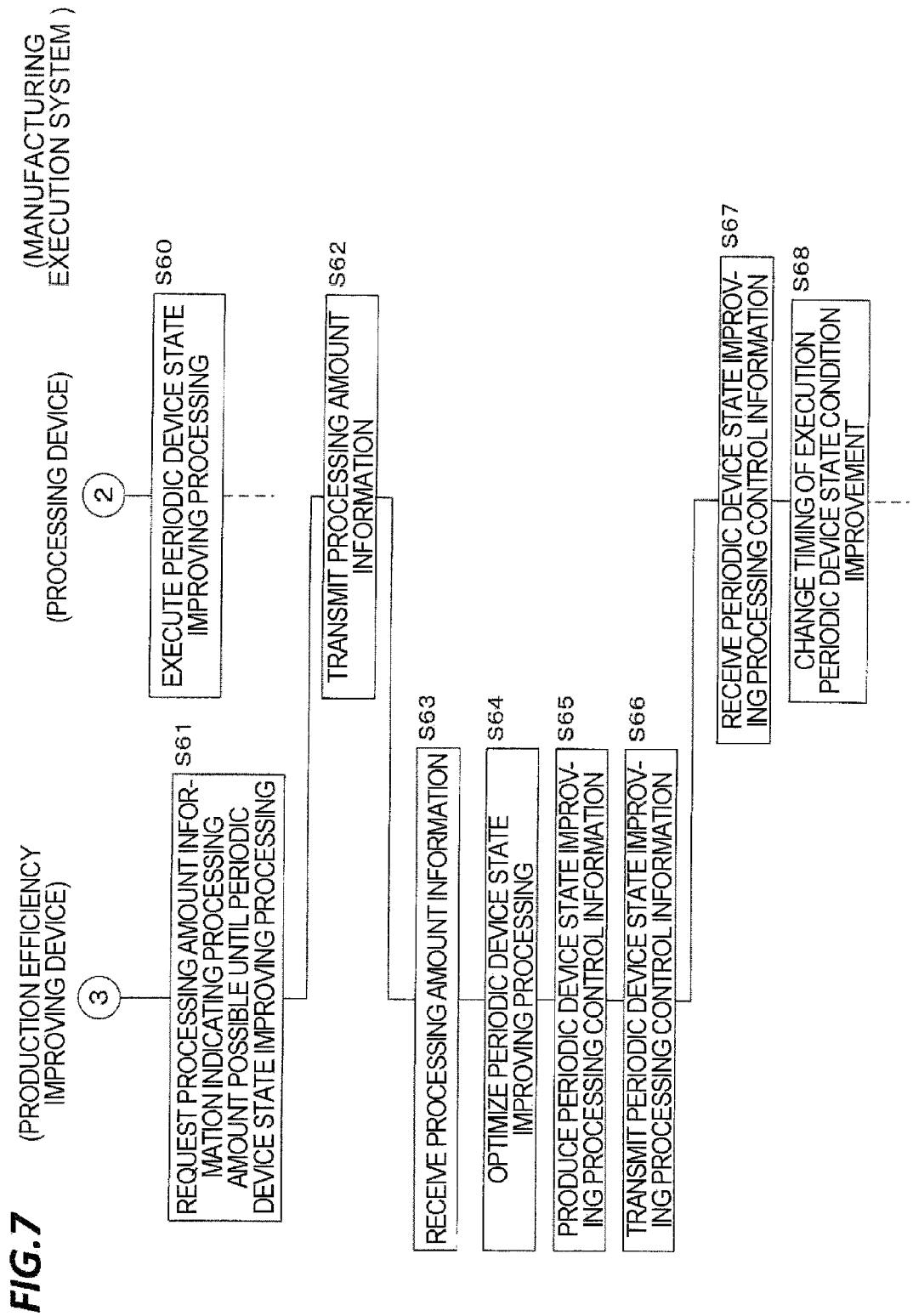
FIG. 7 is a flowchart illustrating the processing sequence of the production efficiency improving device according to the periodic device state improving treatment.

FIGS. 6 and 7 are flowcharts illustrating a processing sequence in the production efficiency improving device 1 according to periodic device state improving processings. Hereinafter, descriptions will be made on processing of predicting the arrival of a workpiece and optimizing of the execution timing of the periodic device state improving processings based on the prediction in the execution sequence of executing the periodic device state improving processings and description on other processing sequences will be omitted.

When the number of workpieces which have been processed or the sum of a time spent for processing the workpieces has come close to a periodic maintenance work execution standard, for example, 90% of the periodic maintenance work execution standard, the processing device 2 transmits a periodic device state improving processing occurrence schedule information to the production efficiency improving device 1 (step S51). The periodic device state improving processing occurrence schedule information includes information that indicates the time when the device state improving treatment is executed.

The control unit 11 of the production efficiency improving device 1 receives the periodic device state improving processing occurrence schedule information transmitted from the processing device 2 (step S52). In addition, the control unit 11 requests processing schedule information, which indicates a processing schedule of a transmission source of the periodic device state improving processing occurrence schedule information on a workpiece in the processing device 2, from the manufacturing execution system 4 (step S53).

According to the request from the production efficiency improving device 1, the manufacturing execution system 4 transmits the processing schedule information, which indicates the processing schedule of the workpiece in the processing device 2, to the production efficiency improving device 1 (step S54).

The control unit 11 of the production efficiency improving device 1 receives the processing schedule information transmitted from the manufacturing execution system 4 (step S55). In addition, the control unit 11 determines whether a period where the processing for the workpiece is executed in the processing device 2 and a period where the device state improving treatment is executed overlap, based on the periodic device state improving processing occurrence schedule information and the processing schedule information (step S56). When it is determined that both periods do not overlap (step S56, No), the control unit 11 produces the periodic device state improving processing control information that instructs the execution of the device state improving treatment (step S57) and transmits the produced periodic device state improving processing control information to the processing device 2 (step S58).

The processing device 2 receives the periodic device state improving processing control information (step S59) and executes the periodic device state improving processing according to the schedule (step S60).

When it is determined that both periods overlap in step S56 (step S56: YES), the control unit 11 requests processing amount information that indicates the number of workpieces which may be processed or a time allowed to process workpieces until the next periodic device state improving processing is executed (step S61).

According to the request from the production efficiency improving device 1, the processing device 2 calculates the processing amount information and transmits the calculated processing amount information to the production efficiency improving device 1 (step S62). The processing device 2 is stored with, for example, the average number of workpieces which may be processed per unit time and calculates the number of workpieces which may be processed, based on a length of time from the present time to the time when the next periodic device state improving processing is executed and the average number.

The control unit 11 of the production efficiency improving device 1 receives the processing amount information transmitted from the processing device 2 (step S63) and optimizes the amount of workpieces which may be allocated to the processing device 2 and the sequence of the periodic device state improving processing, based on the received processing amount information (step S64). The optimization refers to, for example, a state where a period of executing the processing on a workpiece in each processing device 2 and a period of executing the periodic device state improving processing in each processing device 2 do not overlap. It is desirable that a predetermined length of time or more is set between the finish time of the periodic device state improving processing and the start time of the processing for the workpiece. This is because a time may be required for a preparation processing associated with a workpiece to be subsequently processed after the periodic device state improving processing is finished.

Subsequently, the control unit 11 of the production efficiency improving device 1 produces the periodic device state improving processing control information that causes the processing device 2 to execute the optimized periodic device state improving processing (step S65) and transmits the produced periodic device state improving processing control information to the processing device 2 (step S66).

Specifically, the production efficiency improving device 1 instructs the processing device 2 to execute early or delay insertion of the periodic maintenance work by the processing device 2 according to an interval or a frequency until the next workpiece arrives at the processing device 2. When a plurality of processing devices 2 capable of executing the equivalent processing are present, the production efficiency improving device 1 instructs the processing device 2 to execute the insertion of the periodic maintenance work in such a manner that periodic device state improving processings are not concentrated.

The processing device 2 receives the periodic device state improving processing control information (step S67) and changes a timing of starting the periodic device state improving processing according to the received periodic device state improving processing control information (step S68).

According to the production efficiency improving device 1 configured as described above, it is possible to shorten a waiting time until the processing for a workpiece is started after the workpiece actually arrives at a processing device 2 and to avoid a situation in which the processing device 2 cannot process a workpiece even though a workpiece to be processed has arrived at the processing device 2 since the processing device 2 is in the process of performing a device state improving processing. As a result, the overall processing performance of the plurality of processing devices 2 may be improved.

Meanwhile, in the above-described examples, the device state improving treatment and the preparation processing efficiency improving processing are performed without considering the past results. The processing performance on a workpiece when a processing device is operated (for example, the number of increased particles on a workpiece or a deposition speed of a film before and after the processing) may be calculated based on the device state improving treatment control information, the preparation processing control information, and the periodic processing control information which are transmitted to the processing device 2. The calculated processing performance, the device state improving treatment control information, the preparation processing control information, and the periodic processing control information may be collected in the external memory device 12 to be correlated to each other. Subsequently, the operation of the processing device 2 may be optimized by adding the information collected in the external memory device 12. Processings on workpieces may be more efficiently performed.

The production efficiency improving device 1 may be configured such that it does not have a direct connection port with the manufacturing execution system 4. In this case, the production efficiency improving device 1 may transmit workpiece lot information received from the conveyance control system 6 to a processing device 2 as it is so that the processing device 2 may inquire of the production execution control system about the workpiece lot information via a conventional connection port (not illustrated).

Modified Example 1

A production efficiency improving device 1 according to Modified Example 1 inquires of the manufacturing execution system 4 about flexibility of a command from the manufacturing execution system 4. When the production efficiency improving device 1 may process a workpiece by selecting a predetermined processing device 2 among the same kinds of processing devices 2, the production efficiency improving device 1 requests information for specifying an alternative processing device 2 and an alternative processing condition. In addition, when the control unit 11 of the production efficiency improving device 1 instructs execution of the periodic device state improving processing by the processing device 2, the control unit 11 controls the operation of the processing device 2 such that the alternative processing device 2 may execute the periodic device state improving processing at a different timing. That is, the production efficiency improving device 1 controls the operation of processing devices 2 in such a manner that the processing devices 2 which may execute the same kind of processing, do not to execute the periodic device state improving processing in parallel.

According to Modified Example 1, insertion of the periodic device state improving processing in a processing device 2 may be standardized. Accordingly, the overall processing performance of a plurality of processing devices 2 may be improved.

Modified Example 2

A production efficiency improving device 1 according to Modified Example 2 inquires of the manufacturing execution system 4 about flexibility of a command from the manufacturing execution system 4. When a processing executing sequence of a plurality of sets of workpieces to be processed in one processing device 2 may be reversed, the production efficiency improving device 1 requests lot identification information of the workpieces to identify the workpieces of each lot and a processing condition of the workpieces of each lot. In addition, the control unit 11 of the production efficiency improving device 1 transmits the processing condition of the workpieces of each lot to the processing device 2 so as to determine a sequence in which a change of processing conditions of the sequentially executed processings for the workpieces is minimized. In addition, the production efficiency improving device 1 transmits control information to the conveyance control device 31 so as to control the operation of the conveyance devices 32 such that the workpieces of each lot are transported to the processing device 2 according to the determined sequence. Further, the control unit 11 of the production efficiency improving device 1 controls the operation of the processing device 2 so as to execute a preparation processing required to execute the processing of the workpieces according to the sequence.

Modified Example 2 may shorten a preparation processing time, thereby improving the processing performance of the production processing system.

Modified Example 3

Based on a delivery result of workpieces by conveyance devices to a processing device group that performs a processing prior to a processing performed by one processing device group (a plurality of processing devices that may perform the same processing) and an average length of time from the delivery of a workpiece to a processing device in which the preceding processing has been executed to the recovery of the workpiece, the production efficiency improving device predicts the number of workpieces for which a processing request for processing products of the processing device group is made to predict a change of processing load of the processing device group. When the processing load is low, the production efficiency improving device instructs the processing device group to perform, for example, calibration of a robot or a measuring instrument, replacement of consumables, open cleaning (wet cleaning) of a chamber, using that period, in a preferential manner from a processing device, for which the time for necessary maintenance requiring shift to a non-operating state mode approaches, among the processing devices a. Then, the states of the processing devices may be maintained to be suitable for processing workpieces without damaging productivity of the production line.

Modified Example 4

Based on a delivery result of workpieces to a processing device group that performs a processing prior to a processing performed by one processing device group (a plurality of processing devices that may perform the same processing) and an average length time from the delivery of a workpiece to a processing device in which the preceding processing is executed to the recovery of the workpiece, the production efficiency improving device predicts the number of workpieces for which a processing request for processing device group products is made so as to predict a change of processing load of the processing group. When the processing load is high, the production efficiency improving device instructs a processing device to suppress entry into a non-production processing from which a returning time to a state where a workpiece may be processed is long. The processing device, which receives an instruction to suppress the entry into a long non-production processing from the production efficiency improving device, waits for the arrival of a workpiece to be processed subsequently in an idle state without performing conditioning (e.g., plasma cleaning) from which a returning time to a state where the workpiece may be processed is long.

Modified Example 5

The MES designates a device group without specifying a device that is to process a workpiece. The production efficiency improving device has a function of selecting a device and a chamber from a plurality and the same kind of processing devices. When the processing load of the processing device group is low, the production efficiency improving device may set some devices in an energy saving operating mode so as to reduce used power such as electric power. Meanwhile, even when it is predicted that the processing load of the processing device group becomes high, the production efficiency improving device may take an action of, for example, leaving one chamber, into which a special processing is to be inserted, always empty so as to perform a processing in a seamless manner, by selecting a processing device which is the best in state.

Modified Example 6

A production efficiency improving device 1 according to Modified Example 6 has two kinds of conditions for instructing execution of a device state improving processing such as cleaning. The device state improving treatment includes, for example, a processing of removing depositing materials on the inner components in a chamber using gas which is called "dry cleaning", a processing of maintaining an atmosphere and reducing particles in the chamber which is called "purging", and a processing of removing moisture in the chamber which is called "baking". A first condition is that, when an empty time until the schedule time when the next workpiece arrives at a processing device 2 is equal to or longer than a pre-set length of time, the processing device 2 is made to execute the device state improving treatment such as cleaning. The second condition is that, when a processing device 2 meets this condition, the processing device 2 is made to execute the device state improving treatment such as cleaning even if an empty time until the schedule time when the next workpiece arrives at the processing device 2 is shorter than a pre-set length of time.

Each condition is set as the number of processing times on workpieces, for example, after the last device state improving processing. For example, a first set cumulative-value that for defining the first condition is 40 times and a second set cumulative-value that defines the second condition is 50 times. When the number of processing times on the workpieces in a processing device 2 is 40 times or more, and an empty time until the schedule time when a workpiece to be subsequently processed arrives at the processing device 2 is equal to or longer than a pre-set length of time, the production efficiency improving device 1 instructs the processing device 2 to execute the device state improving treatment. When the empty time until the schedule time when the workpiece to be subsequently processed arrives at the processing device is still less than the pre-set length of time even if processings on the workpieces have been performed 40 times or more, the execution instruction of the device state improving treatment based on the first condition is not made. Even under such a situation, when the number of processing times on the workpieces arrives at 50 times of the second set cumulative-value to satisfy the second condition, the production efficiency improving device 1 instructs the processing device 2 to execute the device state improving treatment regardless of the empty time until the schedule time when the workpiece to be subsequently processed arrives at the processing device 2.

Herein, the predetermined length of time is set to be equal to or longer than a time required for the device state improving treatment such that, when the predetermined length of time is included in a conveyance timing where the device state improving treatment due to the second condition is performed, the device state improving treatment may be performed without having influence on a time capable of performing a processing on a workpiece.

Here, when the pre-set length of time is set to be shorter than a time required for the device state improving treatment, for example, to a half of the time required for the device state improving treatment, an influence exerted on a time for processing a workpiece by the maintenance according to the first condition may be reduced. For example, it is assumed that the time required for the device state improving treatment is 30 minutes and the pre-set length of time is set to 15 minutes. When the number of processing times on workpieces arrives at 40 times and a remaining time until the schedule time when the next workpiece arrives at a processing device is 15 minutes or more after the last device state improving processing, the production efficiency improving device 1 instructs the processing device to perform the device state improving treatment. Practically, even if the next workpiece arrives at the processing device after 16 minutes from the present time and thereafter, a workpiece is adapted to arrive at the processing device continuously, the time required for the device state improving treatment is not 30 minutes but 14 minutes because the device state improving treatment is performed using the empty time of 16 minutes. Therefore, as compared to, for example, a case in which maintenance is performed when the second condition is satisfied regardless of the empty time, the overall processing performance in the production process may be improved statistically.

Cumulative numbers of processing times have been exemplified as values compared with the specific first and second set cumulative-values under the first and second conditions, that is, numerical values representing the states of a processing device 2. However, a cumulative value of the thickness of a film or the number of particles attached to an inner wall of a chamber for each processing condition may be used. The production efficiency improving device 1 may acquire and calculate information such as the number of cumulative processing times after the last device state improving processing from the processing device 2, or obtain the number of processing times remaining until the next device state improving processing from the processing device 2. A cumulative value of a film pressure may be acquired through an automatic measurement or calculated by an equation based on a processing condition and a processing time. The cumulative value may be calculated based on a measurement result representing the number of particles in a processing chamber or a measurement result of a film thickness, which is acquired by an external instrument.

A set time which is one of set values of the first condition may be set by a method easily recognized by a user, and may be set to, for example, an empty time during which a workpiece is not processed. The set time may not be set to the empty time but to a time during which the device state improving treatment may be performed continuously even after arrival of a workpiece to be subsequently processed. In general, it may be said that when time is set by the latter method, the user may sets the condition more easily. That is, when the set time for the first condition is set as 15 minutes, the execution of the device state improving treatment is instructed if the number of processing times is set to be equal to or more than the first cumulative number of processing times and the device state improving treatment may be completed after 15 minutes from the schedule time of arrival of the workpiece to be subsequently processed.

Here, the time required for the device state improving treatment may be set in the production efficiency improving device 1. The production efficiency improving device 1 may have information which specifies a recipe of an adjustment processing thereof so as to inquire of a processing device 2 about a time required based on the information or to maintain a time obtained by inquiring of the processing device 2 in the past. Alternatively, the time required for the device state improving treatment may be a time calculated by the production efficiency improving device 1 statistically based on a time required for the adjustment processing in the past.

A processing sequence of implementing the processing contents described above will be described below.

In the control unit 11 of the production efficiency improving device 1, the second communication unit 15 receives information associated with arrival schedule which is transmitted from the conveyance control device 31. In addition, the control unit 11 predicts the time when a predetermined conveyance device 32 arrives at one processing device 2 based on the information received by the second communication unit 15. Meanwhile, the control unit 11 predicts the time when a processing on a workpiece is finished in the one processing device 2 is based on the information received by the first communication unit 14. For example, when each processing device 2 is configured to transmit information which indicates that a processing on a workpiece has been finished to the production efficiency improving device 1, the control unit 11 of the production efficiency improving device 1 predicts the time when the processing on the workpiece in the one processing device 2 is finished by receiving the information. Further, the control unit 11 may be configured to predict the time when the processing on the workpiece is finished in the one processing device 2 is based on information transmitted from processing devices 2, for example, information which does not directly indicates the finish time such as the number of workpieces. Subsequently, the control unit 11 transmits processing control information, which instructs instruct the execution of the device state improving treatment based on the time when a conveyance device 32 arrives at the one processing device 2 and the time when the processing on the workpiece in the one processing device 2 is finished, from the first communication unit 14 to the first processing device 2. Specifically, when a cumulative value of processings on workpieces according to production in the one processing device 2 is equal to or more than a specific first set cumulative-value and the time until a workpiece arrives at the processing device 2 after the processing in the one processing device 2 has been finished is equal to or more than a specific set time, the control unit 11 transmits the processing control information to the processing device 2 to instruct the execution of the device state improving treatment. The first set cumulative-value and the set time are stored in the external memory device 12 as a value which is set in advance or input from the outside. The cumulative value of processings on workpieces according to the production in a processing device 2 is acquired when the processing device 2 transmits the cumulative value of the processings to the production efficiency improving device 1 and the production efficiency improving device 1 receives the cumulative value. Further, when the cumulative value of processings on workpieces according to the production in the one processing device 2 is equal to or more than a second set cumulative-value which is larger than the first set cumulative-value, the control unit 11 transmits the processing control information to the processing device 2 so as to instruct execution of the device state improving treatment regardless of the arrival schedule time.

Meanwhile an example in which the production efficiency improving device 1 determines a timing of executing the device state improving treatment has been described here. However, the processing devices 2 may be configured to determine the timing of executing the device state improving treatment. That is, the processing devices 2 acquire the time when a conveyance device 32 arrives at the processing devices 2 or predict the time by acquiring information for predicting the time from the conveyance device 32. Further, the processing devices 2 are stored with a cumulative value of processings on workpieces according to production after a device state improving processing. In addition, each of the processing devices 2 executes the device state improving treatment when the cumulative value is equal to or more than the first set cumulative-value and a length of time to the predicted time when a conveyance device 32 arrives at the processing device 2 is equal to or longer than a pre-set length of time.

Modified Example 7

A production efficiency improving device 1 according to Modified Example 7 has the same configuration as that of Modified Example 6, and sets the number of processing chambers (the number of processing chambers capable of performing production) which do not simultaneously perform a device state improving processing such as the cleaning, among processing chambers capable of performing the same processing, that is, the number of processing chambers capable of processing workpieces. The number of processing chambers is stored in the external memory device 12 of the production efficiency improving device 1. Further, the external memory device 12 is also stored with information which specifies the processing chambers capable of performing the same processing. The information is, for example, obtained by correlating processing chamber identification information for identifying a plurality of processing chambers with information indicating processing contents which may be performed in the processing chambers.

For example, let's assume that five processing chambers capable of performing the same processing on workpieces are present in one processing device 2 and, among the processing chambers capable of performing the same processing, the number of processing chambers which do not simultaneously perform the processing such as cleaning is set as 3. The control unit 11 of the production efficiency improving device 1 instructs the two processing chambers to execute the device state improving treatment and does not instruct the three remaining processing chambers to execute the device state improving treatment even if the first condition is satisfied in all the processing chambers and the empty time until a workpiece arrives at the processing chambers is equal to or more than a set length of time.

As a result, a state in which all the processing chambers are not capable of processing workpieces, thereby suppressing reduction in production capability in an entire semiconductor factory. Further, this is not limited to only one processing device 2. It is more desirable to perform the same management by integrating processing chambers capable of performing the same processing over a plurality of processing devices 2, for example, in any bay unit in the factory.

Meanwhile, even in this case, when the first condition is not satisfied but the second condition is satisfied, for example, when the number of cumulative processing times of workpieces reaches 50, the device state improving treatment is executed even if the number of empty chambers is less than a predetermined set value. That is, even if the number of processing chambers capable of performing the same processing is four, all the four processing chambers are instructed to execute the device state improving treatment when all the four processing chambers satisfy the first condition, that is, when the number of cumulative processing times of workpieces reaches 50. This is to prevent an adverse influence on the processing performance for the workpieces.

Modified Example 8

A production efficiency improving device 1 according to Modified Example 8 has the same configuration as that of Modified Example 6 or 7, and is configured to execute a preparation processing before workpieces arrive at processing chambers. The processing sequence is called a recipe. According to a processing recipe for workpieces, there is a preparation processing to be performed before a workpiece is loaded in a processing chambers exists. For example, when a processing start temperature is 400° C., it is required to perform a advance preparation as a preparation processing such that the temperature of the processing chamber is stabilized at 400° C. at a step before the workpiece is loaded in the processing chamber. A processing to be prepared in such a processing device 2 before a workpiece arrives at the processing device 2, that is, a preparation processing is performed.

The contents instructed to a processing device 2 in order to perform a preparation processing, the control unit 11 of the production efficiency improving device 1 may be a content that notifies the processing device 2 of a kind of recipes of workpieces to be processed subsequently, for example, a recipe ID or a recipe name, and a content that instructs the processing device 2 to perform a preparation recipe and execution thereof. When the kind of recipes of workpieces to be processed subsequently is notified to the processing device 2, the processing device 2 takes out a preparation recipe associated with the recipes and executes the preparation recipe.

As a result, because the preparation processing may be finished within an empty time until arrival of a workpiece, a time until a processing on the workpiece starts after the arrival of the workpiece may be shortened.

For example, when a process of processing a workpiece at 300° C. is executed, the control unit 11 of the production efficiency improving device 1 transmits processing control information to a processing device so as to instruct the processing device to set a processing chamber to 300° C. before the workpiece arrives at the processing device 2. The control unit 11 of the production efficiency improving device 1 may instruct the processing device 2 to set the processing chamber to 300° C. or may notify the processing device 2 of a recipe ID or name so that the processing device 2 selects and executes a preparation processing based on the recipe ID or name.

For example, the control unit 11 instructs the processing device 2 to insert a plasma cleaning or aging process of the processing chamber by a new gas species before the workpiece arrives at the processing device 2. Based on an ID of the workpiece or an ID of an FOUP, the control unit 11 of the production efficiency improving device 1 transmits the ID to the manufacturing execution system 4 and is notified of a content (recipe) processed by the processing device 2 from the manufacturing execution system 4.

Meanwhile, the ID of a workpiece or the ID of a FOUP is acquired, for example, by reading the ID of the workpiece (alternatively, the FOUP accommodating the workpiece) conveyed by a conveyance device 32 using a reader installed on the conveyance device 32, the stocker, or the conveyance path of the conveyance device 32. Further, when the manufacturing execution system 4 is configured to notify the conveyance control device 31 of the ID of the workpiece such that the conveyance control device 31 transmits the ID to the production efficiency improving device 1, the production efficiency improving device 1 may be configured to acquire the ID of the workpiece. Further, the processing device 2 may notify the ID to the production efficiency improving device 1 when the FOUP accommodating the workpiece of which the processing has been finished is taken out from the processing device 2. Meanwhile, the FOUP accommodating the workpiece is provided with a barcode or a tag where data may be re-written again in a contactless manner. The ID may be obtained by reading the barcode or the tag.

Modified Example 9

A production efficiency improving device 1 according to Modified Example 9 has the same configuration as that of Modified Example 8, and is configured to select a target processing device 2 in a group of processing devices 2 so as to dispense with preparation processings as much as possible. For example, in the case where a first processing device 2 is set to stand by at 300° C. and a second processing device 2 is set to stand by at 250° C., when a processing on a workpiece which needs to be prepared at 250° C. is performed, the control unit 11 of the production efficiency improving device 1 does not select the first processing device 2 but selects the second processing device 2 to perform the processing.

The production efficiency improving device 1 may be configured to change a sequence of processing contents so that advance preparation becomes needless. For example, when a processing device 2 is in the process of executing a recipe of a processing condition A and a workpiece of a processing condition B and a workpiece of a processing condition A are waiting for a processing, the workpiece of processing condition B is processed firstly in the original sequence. However, since the advance preparation is needless, the processing sequence is changed so as to process the workpiece of the processing condition A firstly.

The production efficiency improving device 1 is configured to start the preparation processing when a remaining time in an empty time becomes a time required for the advance preparation. For example, when a time required until the preparation processing is finished after the preparation processing starts is 10 minutes and the empty time until the arrival of the workpiece to be subsequently processed is 30 minutes, an instruction is made to instruct execution of the preparation processing at a timing where the empty time approaches the time required for the preparation processing rather than immediately starting the preparation processing. Further, for example, in a case where the temperature needs to be stabilized at 600° C. in the preparation processing but the temperature at a time point prior to the preparation processing equals to 300° C., the instruction to execute the preparation process is made after 20 minutes has elapsed in the empty time so as to decrease a time until arrival of the workpiece to be subsequently processed after the preparation processing is finished, rather than waiting for the stabilization after increasing the temperature to 600° C. immediately after the empty time begins. Therefore, energy may be saved as compared to a case in which the preparation processing is prepared immediately after the empty time begins.

The above processing contents may be implemented, for example, according to the following processing sequence. The control unit 11 receives, from the third communication 16 or the first communication unit 14, information which indicates a time required for a preparation processing, an energy consumption amount per time when a processing finish state in a processing device 2 is continued, and an energy consumption amount per time when a preparation processing finish state is continued, and information which indicates that a processing on a workpiece in the processing device 2 has been finished. The energy consumption amount is, for example, a consumption amount of power or gas. In addition, when the information indicates the processing on the workpiece in the processing device 2 is finished is received by the third communication unit 16 or the first communication unit 14, the control unit 11 compares the energy consumption amount per unit time when the preparation processing finish state is continued and the energy consumption amount per unit time when the processing finish state in the processing device 2 is continued. Moreover, when the energy consumption amount per time when the preparation processing finish state is continued is larger than the energy consumption amount per time when the processing finish state in the processing device 2 is continued, the control unit 11 transmits the processing control information, which instructs the execution of the preparation processing, to the processing device 2, before and after a time point just before a time required for the preparation processing prior to the predicted time when a conveyance device 32 arrives at the processing device 2.

Modified Example 10

A production efficiency improving device 1 according to Modified Example 10 is configured to perform replacement of a dummy wafer required for a predetermined device state improving processing without deteriorating processing efficiency in a processing device 2 so much.

At the time of cleaning a processing chamber in a processing device 2, a dummy wafer which is not a wafer for production may be placed on a susceptor where a workpiece is placed in order to reduce a damage exerted on the susceptor in the processing chamber. A vertical batch processing device 2 may process a plurality of workpieces at once. Around an end of a boat where the plurality of workpieces is placed dummy wafers are placed instead of wafers for production so as to improve film quality or uniformity by a processing on the wafers for production. Since the dummy wafers become a cause of a bad influence such as particles when the number of using times is increased, it is required to replace the dummy wafer when the number of using times arrives at a predetermined number of using times.

Here, as in Modified Example 6, the production efficiency improving device 1 has, as conditions to replace dummy wafers, a first condition in which the dummy wafers are replaced when there is a time to spare and a second condition in which the dummy wafers are essentially replaced. When managing the dummy waters based on the number of using times, in the first condition, 40 times as a first set number of cumulative using times and 5 minutes as an empty time may be set as set values, and in the second condition, 50 times as a second set number of cumulative using times at which the replacement is essential may be set as a set value.

For example, the production efficiency improving device 1 instructs the replacement of dummy wafers when the number of using times of the dummy wafers arrives at 40 times and the empty time until the schedule time of arrival of a workpiece to be subsequently processed is equal to or longer than a pre-set length of time, for example, 5 minutes or more. Here, the replacement instruction of the dummy wafers is given to a person who operates a processing device 2 called an operator through a message displayed on an operator interface of the processing device, for example, a screen, a light warning display by a signal tower, or a combination thereof. Examples of instruction contents given to the operator may include an example of instructing the operator to request that the device interface instruct the conveyance control device instruct 31 to instruct the processing device 2 to release dummy wafers and instruct a conveyance control device 31 to take out and carry an FOUP which accommodates the released dummy wafers and is placed in a load port, and an example of instructing the operator to request that the device interface request preparation for delivering an FOUP, in which dummy wafers to be newly loaded into the processing device 2 is accommodated, from a storage place.

In order to replace the dummy wafers, the dummy wafers discharged from the processing device are stored in a FOUP placed in the load port, the FOUP is separated from the processing device 2, a FOUP, in which dummy wafers to be newly loaded into the processing device 2, is placed in the load port, and the dummy wafers are taken out from the FOUP. In order to replace the dummy wafers, it is required to use a load port or a wafer carrier. However, since the replacement processing may be performed when an empty time until arrival of workpieces is equal to or more than a predetermined length of time, it is possible to reduce degradation in a production capability that hinders the placement of the FOUP which accommodates the workpieces to be processed.

Meanwhile, even in a case where a replacement condition of the dummy wafers by the first condition is not satisfied, in order to suppressing the dummy wafers from becoming a cause of a bad influence such as particles, the replacement of the dummy wafers is instructed regardless of the empty time until the schedule time of arrival of the workpieces to be subsequently processed when the number of using times of the dummy wafers arrives at 50 times which is the number of using times set as the second condition.

Modified Example 11

A production efficiency improving device 1 according to Modified Example 11 bundles processing devices 2 capable of performing the same processing. The manufacturing execution system 4 selects the processing devices 2 on a group basis capable of performing the same processing rather than selecting one processing device 2 which is made to perform a processing and gives an instruction as to information of specifying workpieces and which group is to process the workpieces to the production efficiency improving device 1. When receiving production instruction information at a group unit, the production efficiency improving device 1 determines which processing device 2 in the group is made to perform the processing. The production efficiency improving device 1 stores information indicating a group to which the plurality of processing devices 2 belongs in the external memory device 12.

As a specific example of a method in which the production efficiency improving device 1 determines which processing device 2 in the group is made to perform a processing, the following method may be exemplified. For example, the production efficiency improving device 1 determines a processing device 2 which does not require advance preparation in the group and causes the processing device 2 to process workpieces. Further, for example, when a desired processing may not be performed unless a processing device 2 is not in a good state, i.e. when a processing, which may be easily influenced by the state of the processing device 2, is performed, the production efficiency improving device 1 determines a processing device 2 which is in a good state in the group and causes the determined processing device 2 to process workpieces. The device which is in a good state is, for example, a processing device 2 in which the number of particles measured in a processing chamber is small. On the contrary, the device which is in a bad state is, for example, a processing device 2 which should be soon subjected to a device state improving processing, replacement of parts, or maintenance such as cleaning in a state where the chamber is opened and the device is not operated. For example, when a film thickness measuring instrument that measures the thickness of a film on a workpiece or a particle measuring instrument that measures particles on the workpiece is present, measurement is performed by using these instruments after the processing. Based on the measurement results, it is determined whether it becomes soon necessary to perform cleaning or the processing device gets dirty. For example, for a processing lot in which the number of particles needs to be decreased as compared with other processing lots, the production efficiency improving device 1 requests that workpieces should be loaded into a processing device 2 in which the number of particles is small based on the measurement results. The measuring instruments may be installed in the processing devices 2 and may be placed somewhere in a factory line and workpieces may be conveyed thereto to be subjected to the measurements.

The control unit 11 of the production efficiency improving device 1 instructs the conveyance control device 31 to convey workpieces or a conveyance container, which accommodates the workpiece, to the processing device 2 determined as described above so that the determined processing device 2 processes the workpieces.

Meanwhile, it is required to notify the processing device 2 determined in the group of processing contents to be performed in the processing device 2. The production efficiency improving device 1 may be configured such that an ID, which specifies the processing contents instructed from the manufacturing execution system 4, for example, a processing recipe, is transmitted to the determined processing device 2. Further, the production efficiency improving device may be configured such that the processing device 2, which has received the workpieces, inquires of the manufacturing execution system 4 about the processing contents.

The workpieces, which may not be subjected to a desired processing by a processing device 2 unless the processing device 2 is in a good state, are specified by the following method. For example, the production efficiency improving device 1 may be configured to receive a designation of a processing chamber, in which a processing shall not be performed to be in correspondence with workpieces or in correspondence with a processing recipe, from the manufacturing execution system 4, and cause the workpiece processing device 2 not to be processed in the designated processing chamber.

For example, when manufacturing semiconductor devices of a specific processing recipe or a specific type, a specification required for processing the semiconductor devices may be high. Despite existence of a plurality of processing chambers capable of performing the same processing, when it is not a case in which all the processing chambers may satisfy the specification and a processing chamber among the plurality of processing chambers is selected based on the information as to which processing chamber may perform the processing, the processing chamber is selected among the processing chambers in which the processing may be performed even if the processing chambers are selected so that, for example, a preparation processing is not required.

The information as to which processing chamber may perform the processing may be information that the production efficiency improving device 1 acquires as a response by inquiring of the manufacturing execution system 4 based on the ID of workpieces or information which is correlated to the lot ID or a naming rule of the lot ID obtained by the manufacturing execution system 4 based on the ID of the workpiece. In the case where the information is correlated to the naming rule of the recipe ID or the lot ID, for example, when the lot ID begins with "A", the processing may be performed in the processing chambers a, b, c, and d, when the lot ID begins with "B", the processing may be performed in the processing chambers c and d, when the lot ID begins with "C", the processing may be performed in the processing chambers a and d, and so on. In addition, a table representing a corresponding relationship between the naming rule of the recipe ID or the lot ID and the processing chambers capable of performing the processing is provided in the processing efficiency improving device and is set by a user or loaded as a configuration file by a user.

Processings of both of a top-end device and a low-end device may be performed with any one recipe. Thus, rather than causing the information of the processing chambers, in which the processing may be performed, to be correlated based on the naming rule of the recipe ID, it is desirable that the information of processing chambers in which the processing may be performed is received from the manufacturing execution system 4 based on the ID of workpieces, or the information is be received from the manufacturing execution system 4 as a lot ID based on the ID of workpieces and the processing instructing device has a corresponding table of processing chambers in which a processing corresponding to the naming rule of the lot ID may be performed.

Exemplary Embodiment 2

A production processing system according to Embodiment 2 of the present disclosure includes a plurality of processing devices 2, a conveyance system 3 including a plurality of conveyance devices 32 and a conveyance control device 31 that controls operations of the conveyance devices 32, the manufacturing execution system (processing execution control device) 4 that controls the operation of each device by giving control instructions to the processing devices 2 and the conveyance system 3, and a production efficiency improving device 1 that communicates various pieces of information with the plurality of processing devices 2, the conveyance system 3, and the manufacturing execution system 4.

The manufacturing execution system 4 has the same constitution as that of Embodiment 1.

The processing devices 2 are substrate processing devices 2 that process a workpiece, for example, a glass substrate for manufacturing an organic EL device or a silicon wafer for manufacturing a semiconductor device, such as, for example, a plasma CVD device, a plasma etching device, a sputtering device, and a PVD device. Further, the processing devices 2 have a function to transmit information for predicting an end time of processing before a processing for a workpiece is finished to the production efficiency improving device 1. Further, the processing devices 2 have a function to transmit processing finish information, which represents that a processing on a workpiece is finished, to the manufacturing execution system 4. Further, the processing devices 2 have an adjustment processing function to change a processing condition parameter, which may be changed in advance, before arrival of a workpiece which requires a change in processing condition (recipe). In addition, the processing devices 2 have a function to prepare an environment for processing a workpiece by executing a cleaning process, an aging process, or the like when conditions before and after the change in processing condition are greatly different from each other. Moreover, the processing devices 2 have a device state improving processing function to automatically execute a device state improving processing configured by a non-production processing sequence of automatically cleaning the inside of a processing chamber, aging, purging gas, or the like, in order to appropriately maintain a processing performance and condition thereof. In addition, the processing devices 2 have a function to urge a worker to exchange or wash parts by transmitting warning information when the sum of the number of the processed workpieces or the work processing time is more than a predetermined value. Further, the processing devices 2 have a function to transmit processing finish information, which represents that a processing on workpieces is finished, to the production efficiency improving device 1.

One configuration example of each processing devices 2 is the same as that of Embodiment 1.

One configuration example of the conveyance system 3 is the same as that of Embodiment 1.

Figure 8:
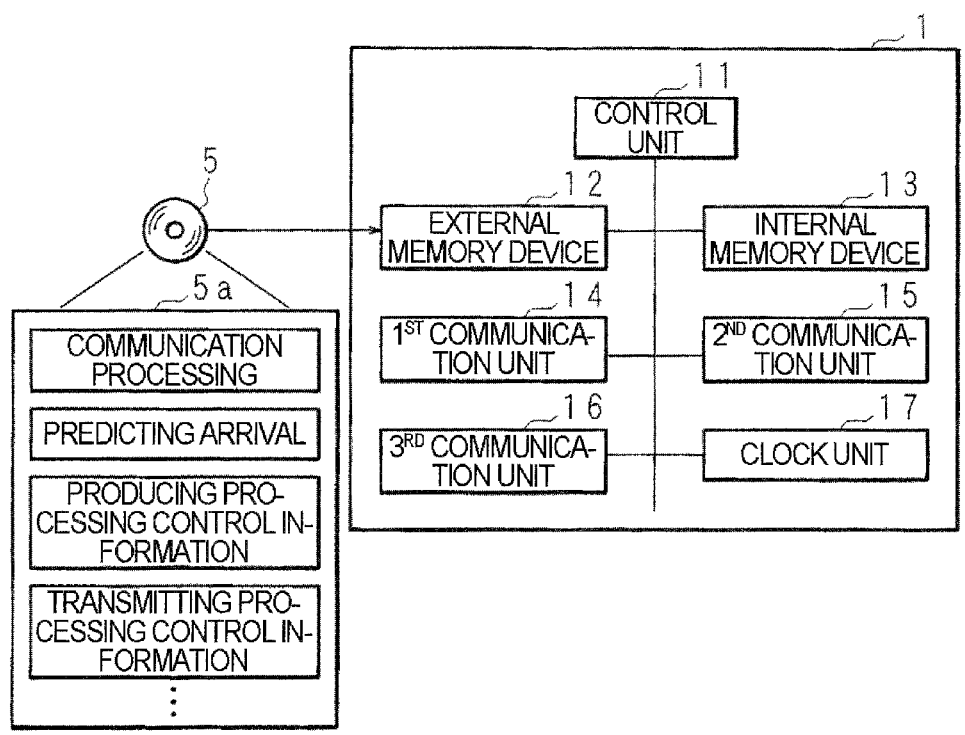
FIG. 8 is a block diagram illustrating a configuration example of a production efficiency improving device according to Exemplary Embodiment 2.

FIG. 8 is a block diagram illustrating one configuration example of the production efficiency improving device 1 according to Embodiment 2. A hardware configuration of the production efficiency improving device 1 is the same as that of Embodiment 1.

Figure 9:
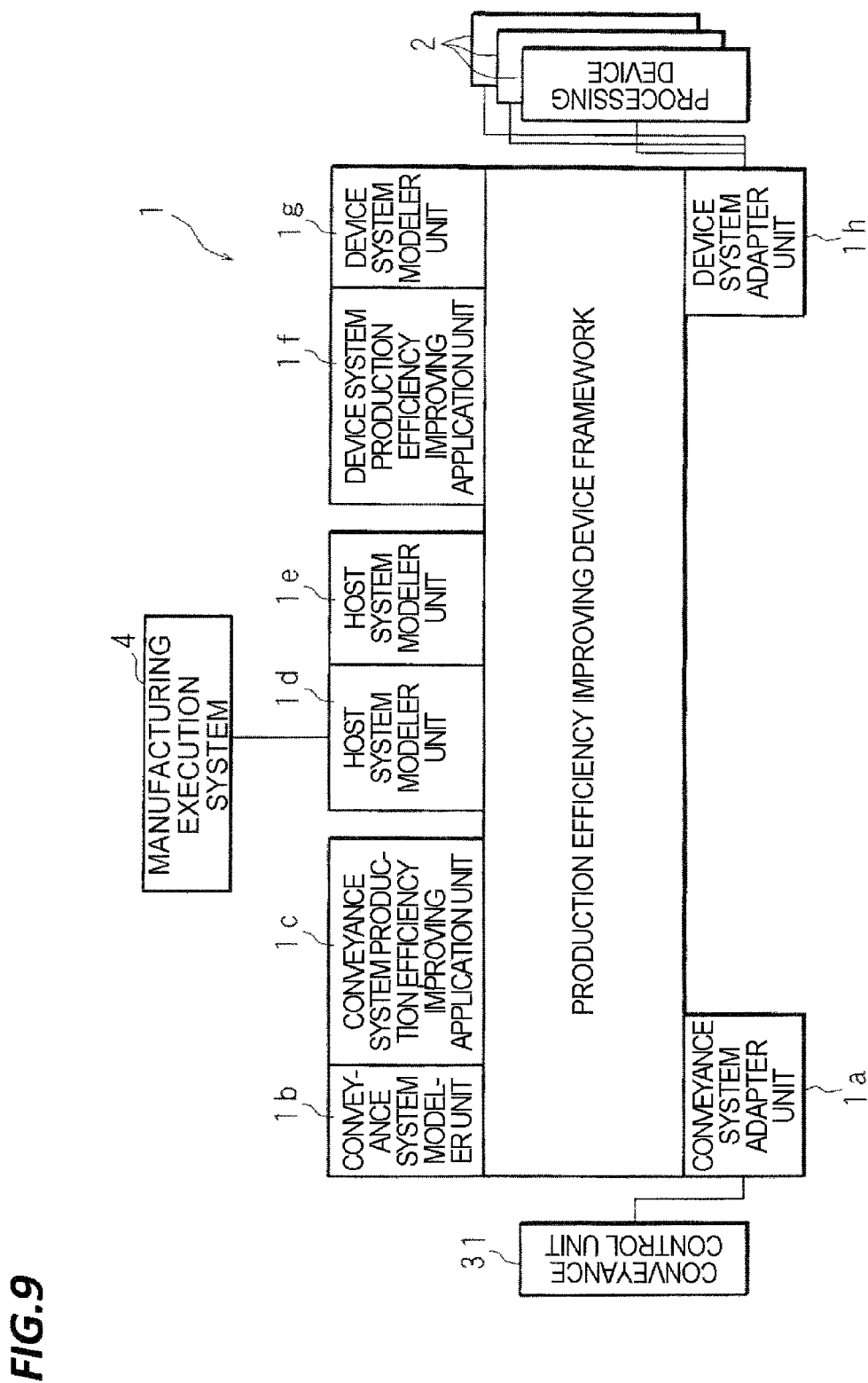
FIG. 9 is a block diagram illustrating a program configuration example of a production efficiency improving device framework.

FIG. 9 is a block diagram illustrating one program configuration example of a production efficiency improving device framework.

A program for configuring the production efficiency improving device 1 has a production efficiency improving device framework. On the production efficiency improving device framework, a modeler unit that produces a model of a control target and a production efficiency improving application unit are provided, and the production efficiency improving application unit communicates with the model of the control target produced by the modeler unit, that is, sends and receives information to and from the information, thereby instructing a production efficiency improving processing to the processing devices 2 and the conveyance control device 31.

The modeler unit includes a conveyance system modeler unit 1b, a host system modeler unit 1e, and a device system modeler unit 1g, which will be described below, and independently models state data and maintains the modeled state data. The state data is a mapping of the state of a control object. Specifically, the state data is configured by a state model of a carrier, a state model of a road port, a state model of a conveyance operation, a model of host system processing condition information, and the like.

A framework of a program configuring the production efficiency improving device 1 includes: a device system adaptor unit 1h that serves as a first communication unit which communicates a processing progression state of workpieces in a plurality of processing devices 2 and processing control information for controlling the operation of the plurality of processing devices 2 with the plurality of processing devices 2 that process the workpieces; a conveyance system adaptor unit 1a that serves as a second communication unit which communicates information with a conveyance control device that controls an operation of conveyance devices which convey the workpieces to the plurality of processing devices 2; a host system adaptor unit 1d that serves as a third communication unit which communicates information with the manufacturing execution system; a device system modeler unit 1g that serves as a conveyance timing prediction unit which predicts a conveyance timing required for conveying a workpiece by a processing unit 2 of a communication destination of information, based on the communication information in the device system adaptor unit 1h that serves as the first communication unit; a conveyance system production efficiency improving application unit 1c that serves as a first processing instructing unit which allows the conveyance system adaptor unit 1a that serves as the second communication unit to transmit processing control information to the conveyance control device 31 so that a conveyance device arrives at the processing device 2 of the communication destination of the information at the conveyance timing predicted by the device system modeler unit 1g that serves as the conveyance timing prediction unit; a conveyance system modeler unit 1b that serves as an arrival timing prediction unit which predicts a timing when the conveyance device arrives at the one processing device 2, based on the information received by the conveyance system adaptor unit 1a that serves as the second communication mean; a device system modeler unit 1g that serves as a finish timing prediction unit which receives information indicating that the processing for a workpiece in the one processing unit 2 is finished by the device system adaptor unit 1h that serves as the first communication unit or predicts a timing when the processing of the workpiece in the one processing device 1 is finished, based on the information received by the device system adaptor unit 1h that serves as the first communication unit; a device system production efficiency improving application unit 1f that serves as a process instructing unit which allows the device system adaptor unit 1h that serves as the first communication unit to transmit processing control information, which instructs execution of a device state improving processing, to the one processing device 2, based on the timing predicted by the conveyance system modeler unit 1b that serving as the arrival timing prediction unit and the timing predicted by the device system modeler unit 1g that serves as the end timing prediction unit; and a host system modeler unit 1e which models processing condition information, based on the information received by the host system adaptor unit 1d that serves as the third communication unit.

The production efficiency improving device 1 is configured to absorb a difference in communication specification with a control object through the conveyance system adaptor unit 1a, the host system adaptor unit 1d, and the device system adaptor unit 1h.

The program of the production efficiency improving device 1 includes an optimizer which, for each control object, performs interpretation and optimization an event from the control object, and has a logic which prohibits an inference for objects other than each control object when a plurality of optimizers link with each other to perform a control. The description that the plurality of optimizers link with each other to perform a control unit that an optimizer performs optimization of a control object handled by the optimizer, based on an inference result of a control object handled by other optimizers. Specifically, it means that the optimizer stores an inference result of the control object handled by the optimizer in an internal storage device or an external storage device, and the other optimizers link with each other with reference to the inference result to perform the control.

However, the production efficiency improving device 1 may be configured to branch off from a communication path that interconnects the manufacturing execution system 4 and the processing devices 2 and a communication path that interconnects the manufacturing execution system 4 and the conveyance control device 31. In this case, when a trouble occurs in the production efficiency improving device, the production efficiency improving device 1 may be separated without inhibiting communication on the original communication path. Further, a computer program configuring the production efficiency improving device 1 is configured to perform communication according to production efficiency improvement independently from the communication between the manufacturing execution system 4 and the processing devices 2 and the communication between the manufacturing execution system 4 and the conveyance control device 31. As a result, the production efficiency improving device 1 may be separated without inhibiting the communication on the original communication path when a trouble occurs in the computer program of the production efficiency improving device 1.

The computer program of the production efficiency improving device 1 may execute an application on the production efficiency improving device framework so as to activate or stop a function related to the production efficiency improvement, without affecting the execution of a manufacturing control instruction from the manufacturing execution system 4, and measures and compares manufacturing efficiencies in both a state in which the function related to the production improving improvement is activated and a state in which the function is stopped.

Meanwhile, in order to secure backup or reduce a load when a trouble occurs in the production efficiency improving device 1, a second computer program, which has the same function as a part or an entirety of the computer program of the production efficiency improving device 1, may be configured to operate on a separate hardware.

A dynamic replacement structure in which applications configuring the computer program may be replaced or added without stopping the production processing system may be provided in the computer program of the production efficiency improving device 1. Specifically, when the production efficiency improving device framework and the applications are made to have a dynamic replacement function, a system which may replace a specific application at any timing may be established.

Figure 10:
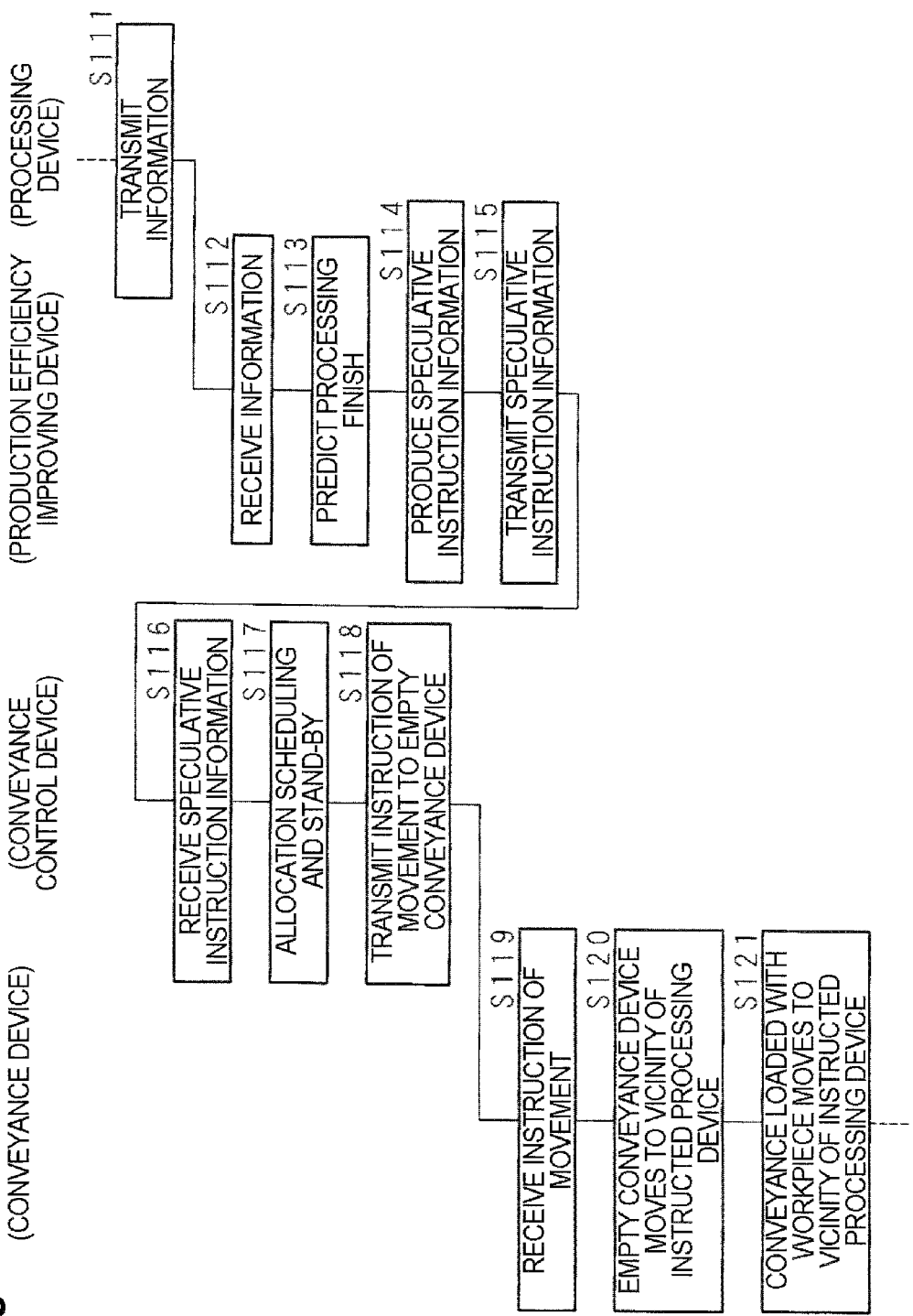
FIG. 10 is a flowchart illustrating a processing sequence of the production efficiency improving device.

FIG. 10 is a flowchart illustrating a processing sequence of the production efficiency improving device.

<Basic Flow of Production Efficiency Improvement of Conveyance Optimization>

A processing device 2 that processes workpieces transmits to the production efficiency improving device 1 information required for predicting the time when the processing on the workpieces is finished (step S111).

Figure 11:
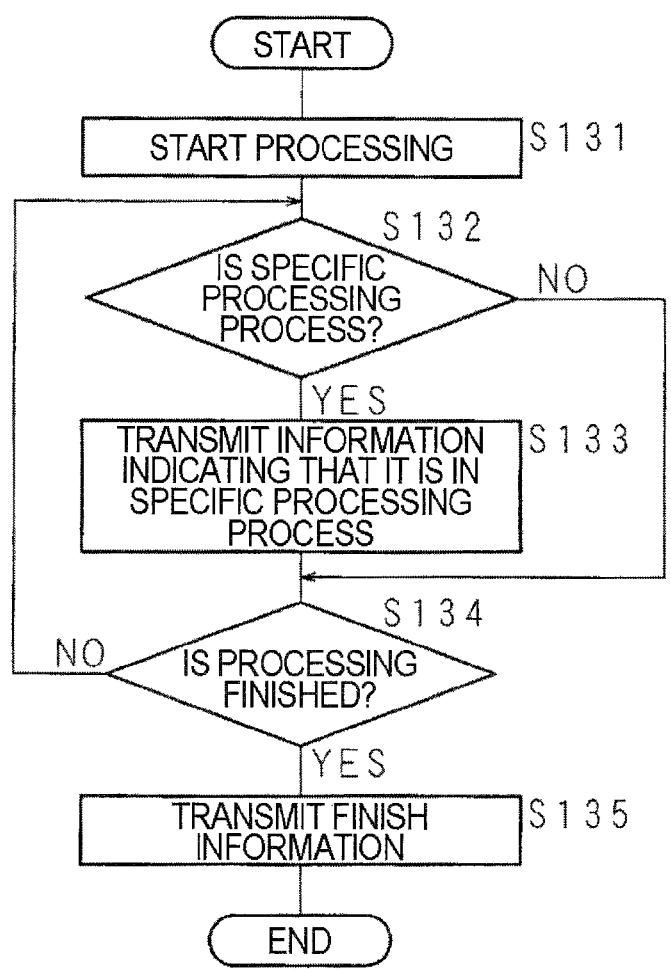
FIG. 11 is a flowchart illustrating an example of an information transmitting sequence in the processing device.

FIG. 11 is a flowchart illustrating one example of an information transmitting sequence in a processing device 2. The processing device 2 starts a processing on the workpieces (step S131). In addition, the processing device 2 determines whether the processing on the workpieces is included in a predetermined specific processing process (step S132). When the processing device 2 determines that the processing is included in the specific processing process (step S132: YES), the processing device 2 transmits information indicating that the processing on the workpieces is included in the specific processing process to the production efficiency improving device 1 (step S133). The information is information reporting that a processing sequence in the processing device 2 has passed through a specific processing step. When the processing in step S133 is finished or when the processing device 2 determines that the processing is not included in the specific processing process (step S132: NO), the processing device 2 determines whether the processing on the workpieces is finished (step S134). When the processing device 2 determines that the processing is not finished (step S134: NO), the processing device 2 proceeds with the processing on the workpieces by returning the processing to step S132. When the processing device 2 determines that the processing is finished (step S134: YES), the processing device 2 transmits finish information to the manufacturing execution system 4 (step S135) and finishes the processing.

For example, the predetermined specific processing process is set as a process in which the number of unprocessed workpieces accommodated in each of FOUPs placed in the first and second load ports 21a and 21b is less than a predetermined number for each, and the processing device 2 sends a report to the production efficiency improving device 1 at a timing when the number of unprocessed workpieces accommodated in each of the FOUPs placed in the load ports 21a and 21b is less than the predetermined number.

For example, in a case where the processing device 2 is a batch type heat treatment device that simultaneously processes a plurality of workpieces, the predetermined specific processing process is a processing step which is set as a predetermined processing step, for example, three steps before the finish step of the processing sequence which is being executed.

Descriptions will be made on a processing after step S112 of FIG. 10.

The control unit 11 of the production efficiency improving device 1 receives the information transmitted from the processing device 2 at the device system adaptor unit 1h (step S112) and predicts the processing finish time when the processing device 2 of a transmission destination of the information finishes the processing at the device system modeler unit 1g, based on the received information (step S113). The processing finish time is, for example, the scheduled time when the processing in the processing device 2 is finished, and the processed workpieces are recovered to a FOUP placed in a load port so that the FOUP may be carried out.

Subsequently, the control unit 11 produces speculative instruction information which makes the device system production efficiency improving application unit 1f instruct movement of the conveyance devices 32 to the processing device 2 of the transmission destination of the information at the timing according to the processing finish time, based on the processing end time predicted by the device system modeler unit 1g (step S114), and transmits the produced speculative instruction information from the conveyance system adaptor unit 1a to the conveyance control device 31 (step S115). The speculative instruction information is one example of control information associated with the control of the conveyance devices 32.

The conveyance control device 31 receives the speculative instruction information transmitted from the production efficiency improving device 1 (step S116). In addition, the conveyance control device 31 executes allocation scheduling of the conveyance devices 32 and stand-by processing of the conveyance devices 32 based on the received speculative instruction information (step S117) and transmits a movement instruction to the conveyance device 32 (step S118). The instruction performed in step S118 is an instruction associated with speculative preparation performed before a definitive control instruction transmitted from the manufacturing execution system 4. A recovery instruction may be transmitted simultaneously when the movement instruction is transmitted to the conveyance devices 32 (step S118).

The conveyance devices 32 receive the instruction from the conveyance control device 31 (step S119). In addition, the conveyance devices 32 move to the vicinity of the instructed processing device 2 according to the received instruction (step S120). That is, a conveyance device 32 for recovering the workpieces processed in the processing device 2 moves to the processing device 2 before the instruction from the manufacturing execution system 4. Subsequently, a conveyance device 32 loaded with the workpieces to be subsequently processed moves to the vicinity of the instructed processing device 2 (step S121).

<Basic Flow of Production Efficiency Improving of Processing Device Optimization>

Figure 12:
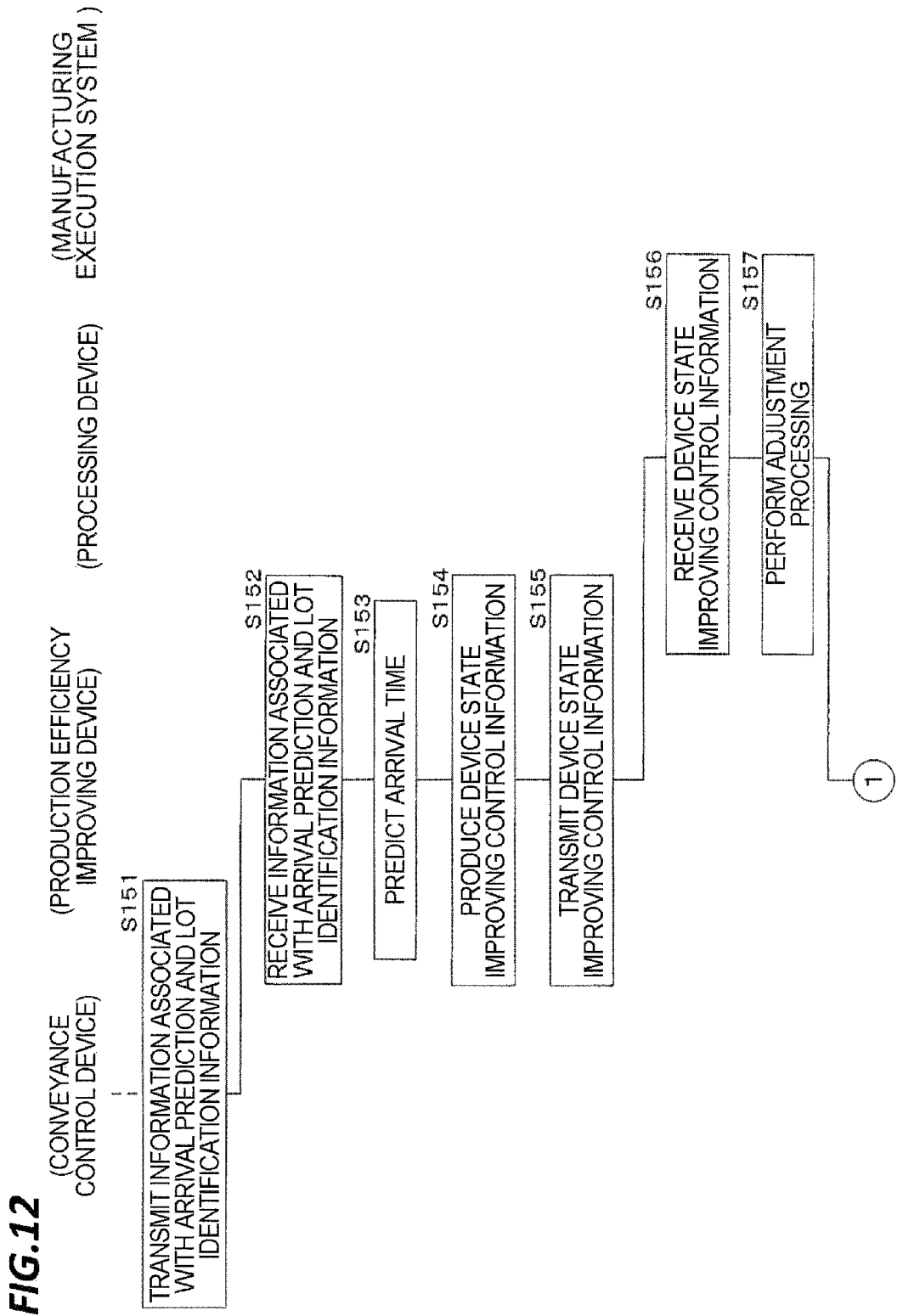
FIG. 12 is a flowchart illustrating a processing sequence in the production efficiency improving device according to a device state improving treatment and a preparation processing.

FIGS. 12 and 13 are flowcharts illustrating a processing sequence in the production efficiency improving device 1 according to the device state improving treatment and the preparation processing. Hereinafter, in particular, arrival preparation of workpieces and preceding processing of a change of a processing condition in a manufacturing sequence will be described and the other processing sequences will be omitted.

Upon receiving a conveyance instruction, the conveyance control device 31 which is controlling the conveyance of workpiece based on an instruction of the manufacturing execution system 4, transmits information (hereinafter, referred to as information associated with arrival prediction) for predicting the time when the conveyance device 32 arrives at the processing device 2 at a conveyance destination and lot identification information for identifying the workpiece transported by the conveyance device 32, to the production efficiency improving device 1 (step S151). The information associated with arrival prediction is, for example, information including the very instruction contents of the manufacturing execution system 4. Further, for example, the information associated with arrival prediction is information including the predicted arrival time calculated by the conveyance control device 31 based on the instruction content of the manufacturing execution system 4. Meanwhile, the information is one example and is not particularly limited so long as the information may be used to predict the time when the conveyance device 32 arrives at the processing device 2, and also includes auxiliary information for predicting the arrival time. As the auxiliary information, layout information of the processing device 2 and information representing a past result required for the conveyance may be exemplified.

The control unit 11 of the production efficiency improving device 1 receives the information associated with arrival prediction which is transmitted from the conveyance control device 31 and the lot identification information, at the conveyance system adaptor unit 1*a* (step S152) and predicts the time when a predetermined conveyance device 32 arrives at the processing device 2, at the conveyance system modeler unit 1*b* (step S153). Subsequently, the control unit 11 produces device state improving processing control information to control the operation of the processing device 2 in the device system production efficiency improving application unit 1*f* so that a device state improving processing, which is configured by a non-production processing sequence for appropriately maintaining a processing performance or condition of the processing device 2, is finished before the conveyance device 32 arrives at the processing device 2 at the conveyance destination (step S154). In addition, the control unit 11 transmits the device state improving treatment control information produced at the device system production efficiency improving application unit 1*f* in step S154 from the device system adaptor unit 1*h* to the processing device 2 (step S155). For example, the device state improving treatment control information includes the predicted time when the workpiece arrives at the processing device 2 at the conveyance destination, and controls the operation of the processing device 2 in the following manner: when the device state improving treatment in the processing device 2 may be finished before the predicted time, the processing device 2 begins the device state improving treatment, when the device state improving treatment may not be finished before the predicted time, the processing device 2 delays the device state improving treatment, and when the device state improving treatment is being performed, the processing device finishes the device state improving treatment before the conveyance device 32 arrives at the processing device 2.

The control unit 11 of the production efficiency improving device 1 may be configured to operate as follows.

The control unit 11 receives information indicating that a processing on workpiece in one processing device 2 is finished by the first communication unit 14 or predicts the time when the processing on the workpiece in the one processing device 2 is finished based on the information received by the first communication unit 14, produces processing control information to instruct execution of the device state improving treatment, based on the predicted time when the conveyance device 32 arrives at the one processing device 2 and the predicted time when the processing on the workpiece in the one processing device 2 is finished, and transmits the produced processing control information to the one processing device 2 by the first communication unit 14. The processing control information is transmitted to the processing device 2, for example, when it is anticipated that the device state improving treatment in the processing device 2 is finished before and after the conveyance device 32 arrives at the processing device, that is, at a time earlier or later than the predicted arrival prediction time of the conveyance device 32 by a predetermined length of time. That is, the control unit 11 calculates a difference between the predicted time when the conveyance device 32 arrives the one processing device 2 and the predicted time when the processing on the workpiece in the one processing device 2 is finished, that is a time difference between the respective time points, and when a difference between a time required for the device state improving treatment and the calculated time is less than a predetermined value, the control unit 11 transmits the processing control information to the one processing device 2 to instruct the execution of the device state improving treatment. The processing device 2 executes the device state improving treatment such as cleaning when receiving the processing control information.

The processing device 2 receives the device state improving treatment control information transmitted from the production efficiency improving device 1 (step S156). In addition, the processing device 2 executes a processing such as the start or delay of the device state improving treatment according to the received device state improving processing control information (step S157). Further, the processing device 2 executes a processing such as changing of an execution content of the device state improving treatment so as to finish the device state improving treatment at the predicted arrival time of the workpiece so far as possible.

The control unit 11 of the production efficiency improving device 1 transmits the lot identification information received in step S152 to the manufacturing execution system 4 from the host system adaptor unit 1*d* and requests a processing condition of the workpiece corresponding to the lot identification information, that is, a condition for the processing device 2 to execute a specific processing on the workpiece at the device system production efficiency improving application unit 1*f* (step S158).

The manufacturing execution system 4 specifies the processing condition of the workpiece corresponding to the lot identification information according to the request from the production efficiency improving device 1 and transmits processing condition information including the specified processing condition to the production efficiency improving device 1 (step S159).

The control unit 11 of the production efficiency improving device 1 receives the processing condition information transmitted from the manufacturing execution system 4 at the host system adaptor unit 1*d* (step S160). In addition, the control unit 11 produces preparation processing control information which includes the processing condition information and instructs the processing device 2 to execute a preparation processing, required for a processing to be performed on a workpiece scheduled to arrive at the processing device 2 at the device system production efficiency improving application unit 1*f* (step S161) and transmits the produced preparation processing control information to the processing device 2 at the conveyance destination of the workpiece from the device system adaptor unit 1*h* (step S162).

The processing device 2 at the conveyance destination of the workpiece receives the preparation processing control information transmitted from the production efficiency improving device 1 (step S163). In addition, the processing device 2 specifies a condition to be changed by comparing a processing condition of a currently processed workpiece, or a processing condition for a previous workpiece when a currently processed workpiece does not exist, and a processing condition for the workpiece scheduled to arrive (step S164). Meanwhile, the processing condition for the workpiece scheduled to arrive is included in the preparation processing control information.

Subsequently, the processing device 2 executes a preparation processing of changing a processing condition which may be changed in advance, among the processing conditions to be changed (step S165). For example, a temperature condition is changed.

Thereafter, the conveyance control device 31 conveys the workpiece to a designated processing device 2 according to a workpiece delivery instruction from the manufacturing execution system 4, and puts the workpiece in a load port of the processing device 2. At this time, since the processing device 2 finishes the preparation processing required for processing the workpiece which has arrived, a specific processing on the workpiece is performed according to an instruction from the manufacturing execution system 4.

The production efficiency improving device and the program thereof have a framework structure, and the framework provides an application with an inter-application linkage means, an information receiving means, and an application operating rule. As a result, the application side may be specialized to develop an algorithm for improving its own productivity.

The modeler unit includes modeler module units which are independent for a processing device, a conveyance system, and a production execution control system, and state data is independently modeled and kept to keep a model having high reliability, and the models are kept at one location to easily find information on another system.

A program of the production efficiency improving device absorbs a difference from a control target in a communication specification via an adaptor so as to secure versatility of the main body of the production efficiency improving device.

The program of the production efficiency improving device has an optimizer that interprets and optimizes an event from a control object for each control object and prevents an inference for objects other than each control object, thereby preventing competition of inference results which may be generated when a plurality of optimizers perform a control in link with each other.

The program of the production efficiency improving device is configured as a branch from the existing communication paths between a production control execution system and a manufacturing processing device and between a production control execution device and the conveyance control device, and is separable without impairing communication of the original communication path when a trouble occurs in the production efficiency improving device or the program and thus may be restored to a state before the system is introduced.

The program of the production efficiency improving device may actuate or stop an application on the framework without an influence on execution of a manufacturing control instruction of a manufacturing control system, and measure and compare manufacturing efficiencies at the two states.

The program of the production efficiency improving device may actuate an application having an equivalent function on other hardware to secure a back-up or reduce a load when a trouble occurs in one application.

The program of the production efficiency improving device has a dynamic replacement structure in which an application may be replaced or added without stopping the system so that the application may be updated without stopping the system, thereby increasing the availability of the system.

1: production efficiency improving device
2: processing device
3: conveyance system
4: manufacturing execution system
5: storage medium
5a: computer program
11: control unit
12: external memory device
13: internal memory device
14: first communication unit
15: second communication unit
16: third communication unit
17: clock unit
1a: conveyance system adaptor unit
1b: conveyance system modeler unit
1c: conveyance system production efficiency improving application unit
1d: host system adaptor unit
1e: host system modeler unit
1f: device system production efficiency improving application unit
1g: device system modeler unit
1h: device system adaptor unit
21a: first load port
21b: second load port
24: transfer module
25a, 25b, 25c, 25d: process module
31: conveyance control device
32: conveyance device

The invention claimed is:

1. A processing instructing device, comprising:
a first communication unit that communicates information for controlling an operation of a plurality of processing devices with the plurality of processing devices that process a workpiece;
a second communication unit that communicates information with a conveyance control device configured to control an operation of a conveyance device that conveys the workpiece to the plurality of processing devices;
an arrival time predicting unit that, based on the information received by the second communication unit, predicts a time when the conveyance device arrives at one of the plurality of processing device;
a finish time predicting unit that receives information indicating that a processing on the workpiece in the one processing device has been finished by the first communication unit or, based on the information received by the first communication unit, predicts a time when the processing on the workpiece in the one processing device is finished; and
a processing instructing unit that, based on the time predicted by the arrival time predicting unit and the time predicted by the finish time predicting unit, causes processing control information which instructs execution of a device state improving processing to be transmitted to the one processing device by the first communication unit,
wherein, when a cumulative value of processings on workpieces according to production in the one processing device is equal to or larger than a first set cumulative-value or a length of time between the time predicted by the finish time predicting unit and the time predicted by the arrival time predicting unit is equal to or larger longer than a predetermined length of time, the processing instructing unit causes processing control information, which instructs the execution of the device state improving treatment, to be transmitted to the one processing device.

2. The processing instructing device of claim 1, wherein, when the cumulative value of processings on workpieces according to production in the one processing device is equal to or larger than a second set cumulative-value which is larger than the first set cumulative-value, the processing instructing unit causes the processing control information, which instructs the execution of the device state improving treatment, to be transmitted to the one processing device regardless of an arrival schedule time.

3. The processing instructing device of claim 1, wherein the cumulative value of processings on workpieces according to production is a number of cumulative times of processings performed on the workpieces or a cumulative thickness of films formed on the workpieces by the processings on the workpieces in the one processing device.

4. The processing instructing device of claim 1, further comprising:
 a third communication unit that communicates information which indicates a processing content for the workpiece in the processing device with a processing execution control device that controlling the operations of the processing device and the conveyance device, wherein the information received by the second communication unit or the third communication unit includes identification information for identifying the workpiece transported to the one processing device; and
 a unit that requests information on the processing content for the workpiece corresponding to the identification information from the processing execution control device, before the workpiece reaches the one processing device, wherein the processing instructing unit causes the processing control information, which instructs execution of a preparation processing corresponding to the processing content for the workpiece, to be transmitted to the one processing device by the first communication unit before the time predicted by the arrival time predicting unit.

5. The processing instructing device of claim 4, wherein the third communication unit or the first communication unit is configured to receive information that indicates a time required for the preparation processing, an energy consumption amount per unit time when a processing finish state in the one processing device is continued, an energy consumption amount per unit time when a preparation pressing finish state in the one processing device is continued, and the information which indicates that the processing on the workpiece in the one processing device has been finished,
 the processing instructing device further comprises a unit that, when information which indicates that the processing on the workpiece in the one processing device has been finished is received by the third communication unit or the first communication unit, compares the energy consumption amount per unit time when the preparation processing finish state is continued and the energy consumption amount per unit time when the processing finish state in the one processing device is continued, and
 when the energy consumption amount per unit time when the preparation processing finish state is continued is larger than the energy consumption amount per unit time when the processing finish state in the one processing device ends is continued, the processing instructing unit causes the processing control information, which instructs the execution of the preparation processing at a point of time before or after a predetermined length of time from a time which is earlier than the arrival time predicted by the arrival time predicting unit by a length of time required for the preparation processing, to be transmitted to the one processing device by the first communication unit.

6. The processing instructing device of claim 5, wherein the energy consumption amount per unit time is a consumption amount of power or gas.

7. The processing instructing device of claim 4, wherein the information received by the second communication unit or the third communication unit includes a plurality of pieces of identification information for identifying each of workpieces sequentially processed in the processing device, and
 the arrival time predicting unit is configured to predict the time when the conveyance device arrives at the processing device, based on the information received by the second communication unit or the third communication unit and the processing content for the workpiece.

8. The processing instructing device of claim 1, wherein the information received by the third communication unit includes information which indicates a time when the processing content is switched in the processing device, and
 the arrival time predicting unit predicts the time when the conveyance device arrives at the one processing device, based on the information received by the second communication unit and the third communication unit.

9. The processing instructing device of claim 1, further comprising:
 a memory device that stores a control content for the processing device; and
 a unit that, based on the control content, calculates a processing performance of the plurality of processing devices that have been operated,
 wherein the processing instructing unit is configured to cause the processing control information to be transmitted, based the control content stored in the memory device and the calculated processing performance.

10. The processing instructing device of claim 1, wherein the information received by the second communication unit includes information for controlling the operation of the conveyance device.

11. The processing instructing device of claim 1, wherein the information received by the second communication unit includes information which indicates a predicted time when the conveyance device arrives at the processing device.

12. The processing instructing device of claim 1, wherein the device state improving treatment is a cleaning processing performed by placing a dummy workpiece, which is not associated with production, in a processing chamber.

13. The processing instructing device of claim 1, further comprising:
 a unit that is stored with information which specifies processing chambers capable of performing the same processing and a set value of a number of producible processing chambers which indicates a number of processing chambers to be secured as processing chambers capable of performing the same processing on workpieces,
 wherein the processing instructing unit suppresses the instruction of the device state improving treatment so that, among the processing chambers capable of performing the same processing, the processing chambers of the number indicated by the set value of the number of producible processing chambers are in a producible processing state.

14. A processing instructing device, comprising:
a first communication unit that communicates information with a plurality of processing devices that process a workpiece;
a second communication unit that communicates information with a conveyance control device configured to control an operation of a conveyance device that conveys the workpiece to the plurality of processing devices;
a conveyance time predicting unit that, based on the information communicated by the first communication unit, predicts a conveyance time when one processing device at a communication destination of the information requires conveyance of a workpiece;
a first processing instructing unit that causes processing control information to be transmitted to the conveyance control device by the second communication unit so that the conveyance device arrives at the processing device at the communication destination of the information at the conveyance time predicted by the conveyance time predicting unit;
an arrival time predicting unit that, based on the information received by the second communication unit, predicts a time when the conveyance device arrives at the one processing device;
a finish time predicting unit that receives information which indicates that the processing on the workpiece in the one processing device has been finished by the first communication unit, or, based on received information received by the first communication unit, predicts a time when the processing on the workpiece in the one processing device is finished; and
a second processing instructing unit that, based on the time predicted by the arrival time predicting unit and the time predicted by the finish time predicting unit, causes the first communication unit processing control information, which instructs execution of a device state improving processing, to be transmitted to the one processing device.

15. A processing instructing method, comprising:
a first communication step of communicating information for controlling an operation of a plurality of processing devices with the plurality of processing devices that process a workpiece;
a second communication step of communicating information with a conveyance control device configured to control an operation of a conveyance device that conveys the workpiece to the plurality of processing devices;
an arrival time predicting step of, based on the information received in the second communication step, predicting a time when the conveyance device arrives at one of the plurality of processing device;
a finish time predicting step of receiving information indicating that a processing on the workpiece in the one processing device has been finished in the first communication step or, based on the information received in the first communication step, predicting a time when the processing on the workpiece in the one processing device is finished; and
a processing instructing step of, based on the time predicted by the arrival time predicting step and the time predicted in the finish time predicting step, causing processing control information, which instructs execution of a device state improving processing, to be transmitted to the one processing device in the first communication step.

16. A processing instructing method, comprising:
a first communication step of communicating information with a plurality of processing devices that processes a workpiece;
a second communication step of communicating information with a conveyance control device configured to control an operation of a conveyance device that conveys the workpiece to the plurality of processing devices;
a conveyance time predicting step of, based on the information communicated in the first communication step, predicting a conveyance time when one processing device at a communication destination of the information requires conveyance of a workpiece;
a first processing instructing step of causing processing control information to be transmitted to the conveyance control device so that the conveyance device arrives at the processing device at the communication destination of the information at the conveyance time predicted in the conveyance time predicting step;
an arrival time predicting step of, based on the information received in the second communication step, predicting a time when the conveyance device arrives at the one processing device;
a finish time predicting step of receiving information, which indicates that the processing on the workpiece in the one processing device has been finished by the first communication step, or, based on received information received by the first communication step, predicting a time when the processing on the workpiece in the one processing device is finished; and
a second processing instructing step of, based on the time predicted by the arrival time predicting unit and the time predicted by the finish time predicting step, causing the first communication unit processing control information, which instructs execution of a device state improving processing, to be transmitted to the one processing device.

17. A non-transitory computer-readable storage medium storing a computer program that when executed causes a computer to perform:
communicating, by a first communication unit, information for controlling an operation of a plurality of processing devices that process a workpiece;
communicating, by a second communication unit, information with a conveyance control device configured to control an operation of a conveyance device that conveys the workpiece to the plurality of processing devices;
predicting, by an arrival time predicting unit, a time when the conveyance device arrives at one of the plurality of processing device based on the information received at the communicating information with the conveyance control device;
receiving, by a finish time predicting unit, information indicating that a processing on the workpiece in the one processing device has been finished by the first communication unit or, based on the information received by the first communication unit, predicting, by the finish time predicting unit, a time when the processing on the workpiece in the one processing device is finished; and
causing, by a processing instructing unit, processing control information which instructs execution of a device state improving processing to be transmitted to the one processing device by the first communication unit based on the time predicted by the arrival time predicting unit and the time predicted by the finish time predicting unit.

18. A non-transitory computer-readable storage medium storing a computer program that when executed causes a computer to perform:
communicating, by a first communication unit, information with a plurality of processing devices that process a workpiece;
communicating, by a second communication unit, information with a conveyance control device configured to control an operation of a conveyance device that conveys the workpiece to the plurality of processing devices;
predicting, by a conveyance time predicting unit, a conveyance time when one processing device at a communication destination of the information requires conveyance of a workpiece based on the information communicated by the first communication unit;
causing, by a first processing instructing unit, processing control information to be transmitted to the conveyance control device by the second communication unit so that the conveyance device arrives at the processing device at the communication destination of the information at the conveyance time predicted by the conveyance time predicting unit;
predicting, by an arrival time predicting unit, a time when the conveyance device arrives at the one processing device based on the information received by the second communication unit;
receiving, by a finish time predicting unit, information which indicates that the processing on the workpiece in the one processing device has been finished by the first communication unit, or, based on received information received by the first communication unit, predicting a time when the processing on the workpiece in the one processing device is finished; and
causing, by a second processing instructing unit, the first communication unit processing control information, which instructs execution of a device state improving processing, to be transmitted to the one processing device based on the time predicted by the arrival time predicting unit and the time predicted by the finish time predicting unit.

19. A workpiece processing device comprising:
a maintenance unit that executes a device state improving processing of the workpiece processing device;
a unit that is stored with a cumulative value of processings on workpieces according to production after the device state improving treatment; and
an arrival schedule time acquiring unit that acquires information which indicates a time when an unprocessed workpiece arrives at the workpiece processing device,
wherein the maintenance unit executes the device state improving treatment when the cumulative value is equal to or larger than a first set cumulative-value and a length of time until the time acquired by the arrival schedule time acquiring unit is equal to or longer than a set length of time.

20. The processing device of claim 19, wherein, when the cumulative value is equal to or larger than a second set cumulative-value which is larger than the first set cumulative-value, the maintenance unit executes the device state improving treatment regardless of a length of time until a schedule time when the workpiece arrives.

\* \* \* \* \*